US010964945B2

United States Patent
Murakami et al.

(10) Patent No.: US 10,964,945 B2
(45) Date of Patent: Mar. 30, 2021

(54) POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

(71) Applicants: SUMITOMO CHEMICAL COMPANY, LIMITED, Tokyo (JP); TANAKA CHEMICAL CORPORATION, Fukui (JP)

(72) Inventors: Keita Murakami, Niihama (JP); Yoshiaki Honda, Tsukuba (JP)

(73) Assignees: SUMITOMO CHEMICAL COMPANY, LIMITED, Tokyo (JP); TANAKA CHEMICAL CORPORATION, Fukui (JP)

( * ) Notice: Subject to any disclaimer, the term of this patent is extended or adjusted under 35 U.S.C. 154(b) by 0 days.

(21) Appl. No.: 16/762,422

(22) PCT Filed: Jul. 31, 2019

(86) PCT No.: PCT/JP2019/029979
§ 371 (c)(1),
(2) Date: May 7, 2020

(87) PCT Pub. No.: WO2020/027187
PCT Pub. Date: Feb. 6, 2020

(65) Prior Publication Data
US 2020/0266440 A1    Aug. 20, 2020

(30) Foreign Application Priority Data
Aug. 1, 2018 (JP) .............................. JP2018-145007

(51) Int. Cl.
*H01M 4/525* (2010.01)
*H01M 4/36* (2006.01)
(Continued)

(52) U.S. Cl.
CPC ........... *H01M 4/525* (2013.01); *H01M 4/131* (2013.01); *H01M 4/364* (2013.01); *H01M 4/366* (2013.01);
(Continued)

(58) Field of Classification Search
CPC ...... H01M 4/525; H01M 4/131; H01M 4/364; H01M 4/366; H01M 10/0525;
(Continued)

(56) References Cited

U.S. PATENT DOCUMENTS

| | | |
|---|---|---|
| 6,730,435 B1 | 5/2004 | Nakane et al. |
| 2016/0028076 A1 | 1/2016 | Lee et al. |

(Continued)

FOREIGN PATENT DOCUMENTS

| | | |
|---|---|---|
| CN | 105406056 A | 3/2016 |
| CN | 106099059 A | 11/2016 |

(Continued)

OTHER PUBLICATIONS

International Search Report issued in correcponding International Patent Application No. PCT/JP2019/029979, dated Sep. 10, 2019, with English translation.

(Continued)

*Primary Examiner* — Lingwen R Zeng
(74) *Attorney, Agent, or Firm* — McDermott Will & Emery LLP

(57) ABSTRACT

A positive electrode active material for a lithium secondary battery, which includes a lithium-containing composite metal compound in the form of secondary particles that are aggregates of primary particles capable of being doped and undoped with lithium ions, each of the secondary particles having on its surface a coating layer including a metal composite oxide including lithium and aluminum, wherein the positive electrode active material includes at least nickel (Continued)

and aluminum as non-lithium metals, and satisfies all of the requirements (1) to (2).

9 Claims, 3 Drawing Sheets

(51) Int. Cl.
    *H01M 10/0525*      (2010.01)
    *H01M 4/131*      (2010.01)
    *H01M 4/02*      (2006.01)

(52) U.S. Cl.
    CPC .. *H01M 10/0525* (2013.01); *H01M 2004/021* (2013.01); *H01M 2004/028* (2013.01)

(58) Field of Classification Search
    CPC ..... H01M 2004/021; H01M 2004/028; H01M 4/36; H01M 4/505; Y02E 60/10
    See application file for complete search history.

(56) References Cited

U.S. PATENT DOCUMENTS

| | | |
|---|---|---|
| 2016/0276660 A1 | 9/2016 | Choi et al. |
| 2016/0380263 A1* | 12/2016 | Nakayama et al. |
| 2017/0352885 A1 | 12/2017 | Kondo et al. |
| 2018/0019474 A1 | 1/2018 | Lee et al. |
| 2019/0067689 A1 | 2/2019 | Hong et al. |
| 2019/0334170 A1 | 10/2019 | Takamori et al. |

FOREIGN PATENT DOCUMENTS

| | | | |
|---|---|---|---|
| CN | 108281641 A | | 7/2018 |
| CN | 109546101 A | | 3/2019 |
| EP | 3 267 517 A1 | | 1/2018 |
| JP | 4872150 B2 | | 2/2012 |
| JP | 4984478 B2 | | 7/2012 |
| JP | 5034305 B2 | | 9/2012 |
| JP | 2012-204036 A | | 10/2012 |
| JP | 2016-500909 A | | 1/2016 |
| JP | 2016-143490 A | | 8/2016 |
| JP | 6026679 B2 | | 11/2016 |
| JP | 2017-050056 A | | 3/2017 |
| JP | 2017-188211 A | | 10/2017 |
| JP | 2018-508114 A | | 3/2018 |
| JP | 2018-098161 A | | 6/2018 |
| JP | 2018-106892 A | | 7/2018 |
| JP | 2019-046795 A | | 3/2019 |
| KR | 10-2015-0063954 A | | 6/2015 |

OTHER PUBLICATIONS

Japanese Notice of Reasons for Refusal issued in corresponding Japanese Patent Application No. 2018-145007, dated Apr. 23, 2019, with English translation.
Japanese Notice of Reasons for Refusal issued in corresponding Japanese Patent Application No. 2018-145007, dated Sep. 3, 2019, with English translation.
Japanese Decision to Grant a Patent issued in corresponding Japanese Patent Application No. 2018-145007, dated Sep. 24, 2019, with Engish translation.
Korean Decision of Rejection issued in corresponding Korean Patent Application No. 10-2020-7012868, dated Aug. 18, 2020, with English translation.
Chinese Office Action issued in corresponding Chinese Patent Application No. 201980005464.2, dated Aug. 4, 2020, with Engish translation.
Korean Notification of Reason for Refusal issued in corresponding Korean Patent Application No. 10-2020-7012868, dated May 28, 2020, with English translation.
European Office Action issued in corresponding European Patent Application No. 19844230.3-1106, dated Jan. 12, 2021.
European Office Action issued in corresponding European Patent Application No. 19844230.3-1106, dated Jan. 25, 2021.

* cited by examiner

POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

CROSS REFERENCE TO RELATED APPLICATIONS

This application is the U.S. National Phase under 35 U.S.C. § 371 of International Application No. PCT/JP2019/029979, filed on Jul. 31, 2019, which claims the benefit of Japanese Application No. 2018-145007, filed on Aug. 1, 2018, the entire contents of each are hereby incorporated by reference.

TECHNICAL FIELD

The present invention relates to a positive electrode active material for lithium secondary batteries, a positive electrode for lithium secondary batteries and a lithium secondary battery.

Priority is claimed on Japanese Patent Application No. 2018-145007, filed Aug. 1, 2018, the contents of which are incorporated herein by reference.

BACKGROUND ART

Lithium metal composite oxides are used as positive electrode active materials for lithium secondary batteries (hereinafter, also referred to as "positive electrode active material(s)"). Lithium secondary batteries have already been put to practical use not only as compact power supplies for portable telephones, notebook computers and the like, but also as medium- or large-sized power supplies for automobile use, electric power storage use, etc.

Examples of the lithium metal composite oxide include lithium-cobalt composite oxide, lithium-nickel composite oxide, and lithium-nickel-manganese composite oxide. Patent Document 1 describes a positive electrode active material for a non-aqueous electrolyte secondary battery including a coating layer made of a compound containing aluminum on the surface of these lithium metal composite oxides. In Patent Document 1, such a coating layer is provided for suppressing contact of moisture or carbon dioxide in the air with the central portion of the lithium metal composite oxide to thereby improve the weatherability of the positive electrode active material.

PRIOR ART REFERENCES

Patent Document

Patent Document 1: Japanese Unexamined Patent Application Publication No. 2017-188211

SUMMARY OF THE INVENTION

Problems to be Solved by the Invention

When a coating layer is provided on the surface of the lithium metal composite oxide, it is conceivable that the coating layer is formed unevenly, for example, the coating layer may be only partially formed or the thickness of the coating layer may vary. In such a case, an uncoated region or a region where the coating layer is thin serves as a reaction site with the electrolytic solution. In this reaction site, a decomposition reaction of the electrolytic solution occurs, and gas may be generated. The generated gas causes battery swelling.

With respect to the positive electrode active material having a coating layer, the present inventors have found a new problem of selecting a positive electrode active material having a coating layer uniformly formed on the surface of the lithium metal composite oxide.

The present invention has been made in view of the above circumstances, and the object of the present invention is to provide a positive electrode active material for a lithium secondary battery that suffers less generation of gas and suppresses battery swelling, a positive electrode using the same, and a non-aqueous electrolyte secondary battery using the same.

Means to Solve the Problems

Specifically, the present invention is as enumerated in [1] to [10] below.

[1] A positive electrode active material for a lithium secondary battery, which is in the form of particles, and includes a lithium-containing composite metal compound in the form of secondary particles that are aggregates of primary particles capable of being doped and undoped with lithium ions, each of the secondary particles having on its surface a coating layer including a metal composite oxide including lithium and aluminum, wherein the positive electrode active material includes at least nickel and aluminum as non-lithium metals, and wherein the positive electrode active material satisfies all of requirements (1) to (2) below:
(1) [Ave(AR3/AR10)]/[σ(AR3/AR10)], which is a reciprocal of coefficient of variation [σ(AR3/AR10)]/[Ave(AR3/AR10)], is 6.1 or more, wherein:

AR is a ratio of a detection intensity of aluminum and a detection intensity of nickel (detection intensity of aluminum/detection intensity of nickel), each measured by scanning electron microscopy-energy dispersive X-ray spectroscopy (SEM-EDX) with respect to surfaces of the particles of the positive electrode active material for a lithium secondary battery, $AR_3$ is AR when the SEM-EDX is performed at an acceleration voltage of 3 kV, $AR_{10}$ is AR when the SEM-EDX is performed at an acceleration voltage of 10 kV,

[Ave($AR_3/AR_{10}$)] is an average of values of a ratio of the $AR_3$ to the $AR_{10}$ [$AR_3/AR_{10}$],

[σ($AR_3/AR_{10}$)] is a standard deviation of values of a ratio of the $AR_3$ to the $AR_{10}$ [$AR_3/AR_{10}$], and

[σ($AR_3/AR_{10}$)]/[Ave($AR_3/AR_{10}$)] is a coefficient of variation calculated from the average and the standard deviation, and (2) an average value of AR3 is 0.025 or more.

[2] A positive electrode active material for a lithium secondary battery, which is in the form of particles, and includes a lithium-containing composite metal compound in the form of secondary particles that are aggregates of primary particles capable of being doped and undoped with lithium ions, each of the secondary particles having on its surface a coating layer including a metal composite oxide including lithium and zirconium, wherein the positive electrode active material includes at least nickel and zirconium as non-lithium metals, and wherein the positive electrode active material satisfies all of requirements (1) to (2) below:
(1) [Ave(ZR5/ZR10)]/[σ(ZR5/ZR10)], which is a reciprocal of coefficient of variation [σ(ZR5/ZR10)]/[Ave(ZR5/ZR10)], is 1.0 or more, wherein:

ZR is a ratio of a detection intensity of zirconium and a detection intensity of nickel (detection intensity of zirconium/detection intensity of nickel), each measured by scanning electron microscopy-energy dispersive X-ray spectroscopy (SEM-EDX) with respect to surfaces of the particles of the positive electrode active material for a lithium secondary battery, $ZR_5$ is ZR when the SEM-EDX is performed at an acceleration voltage of 5 kV, $ZR_{10}$ is ZR when the SEM-EDX is performed at an acceleration voltage of 10 kV, $[Ave(ZR_5/ZR_{10})]$ is an average of values of a ratio of the $ZR_5$ to the $ZR_{10}$ $[ZR_5/ZR_{10}]$, $[\sigma(ZR_5/ZR_{10})]$ is a standard deviation of values of a ratio of the $ZR_5$ to the $ZR_{10}$ $[ZR_5/ZR_{10}]$, and $[\sigma(ZR_5/ZR10)]/[Ave(ZR_5/ZR_{10})]$ is a coefficient of variation calculated from the ratio average and the standard deviation, and (2) an average value of $ZR_5$ is 0.002 or more.

[3] A positive electrode active material for a lithium secondary battery, which is in the form of particles, and includes a lithium-containing composite metal compound in the form of secondary particles that are aggregates of primary particles capable of being doped and undoped with lithium ions, each of the secondary particles having on its surface a coating layer including a metal composite oxide including lithium and tungsten, wherein the positive electrode active material includes at least nickel and tungsten as non-lithium metals, and wherein the positive electrode active material satisfies all of requirements (1) to (2) below:

(1) $[Ave(WR3/WR10)]/[\sigma(WR3/WR10)]$, which is a reciprocal of coefficient of variation $[\sigma(WR3/WR10)]/[Ave(WR3/WR10)]$, is 2.5 or more, wherein:

WR is a ratio of a detection intensity of tungsten and a detection intensity of nickel (detection intensity of tungsten/detection intensity of nickel), each measured by scanning electron microscopy-energy dispersive X-ray spectroscopy (SEM-EDX) with respect to surfaces of the particles of the positive electrode active material for a lithium secondary battery, $WR_3$ is WR when the SEM-EDX is performed at an acceleration voltage of 3 kV, $WR_{10}$ is WR when the SEM-EDX is performed at an acceleration voltage of 10 kV, $[Ave(WR_3/WR_{10})]$ is an average of values of a ratio of the $WR_3$ to the $WR_{10}$ $[WR_3/WR_{10}]$, $[\sigma(WR_3/WR_{10})]$ is a standard deviation of values of a ratio of the $WR_3$ to the $WR_{10}$ $[WR_3/WR_{10}]$, and $[\sigma(WR_3/WR_{10})]/[Ave(WR_3/WR_{10})]$ is a coefficient of variation calculated from the average and the standard deviation, and (2) an average value of WR3 is 0.005 or more.

[4] The positive electrode active material according to any one of [1] to [3], which has a BET specific surface area of 0.1 m²/g or more and 2.0 m²/g or less.

[5] The positive electrode active material according to any one of [1] to [4], which has a lithium carbonate content of 0.3% by mass or less and a lithium hydroxide content of 0.3% by mass or less.

[6] The positive electrode active material according to any one of [1] to [5], which has a water content of 600 ppm or less.

[7] The positive electrode active material according to any one of [1] to [6], wherein the lithium-containing composite metal compound has an α-NaFeO₂ type crystal structure represented by formula (A) below:

$$Li[Li_x(Ni_aCo_bMn_cM^1_d)_{1-x}]O_2 \quad (A)$$

wherein −0.1≤x≤0.2, 0.5≤a<1, 0≤b≤0.3, 0≤c≤0.3, 0≤d≤0.1, a+b+c+d=1, and $M^1$ is at least one metal selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.

[8] The positive electrode active material according to [7], wherein x in the formula (A) satisfies the following relationship: 0<x≤0.1.

[9] A positive electrode for a lithium secondary battery, including the positive electrode active material of any one of [1] to [8].

[10] A lithium secondary battery, including the positive electrode of [9].

The present embodiment may be any of [11] to [13] below.

[11] A positive electrode active material for a lithium secondary battery, which is in the form of particles, and includes a lithium-containing composite metal compound in the form of secondary particles that are aggregates of primary particles capable of being doped and undoped with lithium ions, each of the secondary particles having on its surface a coating layer which includes a metal composite oxide including lithium and aluminum, and has a lithium ion conductivity, wherein the positive electrode active material includes at least nickel and aluminum as non-lithium metals, has a lithium carbonate content of 0.3% by mass or less and a lithium hydroxide content of 0.3% by mass or less, and satisfies all of requirements (1) to (2) below:

(1) $[Ave(AR3/AR10)]/[\sigma(AR3/AR10)]$, which is a reciprocal of coefficient of variation $[\sigma(AR3/AR10)]/[Ave(AR3/AR10)]$, is 6.1 or more, wherein:

AR is a ratio of a detection intensity of aluminum and a detection intensity of nickel (detection intensity of aluminum/detection intensity of nickel), each measured by scanning electron microscopy-energy dispersive X-ray spectroscopy (SEM-EDX) with respect to surfaces of the particles of the positive electrode active material for a lithium secondary battery, $AR_3$ is AR when the SEM-EDX is performed at an acceleration voltage of 3 kV, $AR_{10}$ is AR when the SEM-EDX is performed at an acceleration voltage of 10 kV, $[Ave(AR_3/AR_{10})]$ is an average of values of a ratio of the $AR_3$ to the $AR_{10}$ $[AR_3/AR_{10}]$, $[\sigma(AR_3/AR_{10})]$ is a standard deviation of values of a ratio of the $AR_3$ to the $AR_{10}$ $[AR_3/AR_{10}]$, and $[\sigma(AR_3/AR_{10})]/[Ave(AR_3/AR_{10})]$ is a coefficient of variation calculated from the ratio average and the standard deviation, and (2) an average value of AR3 is 0.025 or more.

[12] A positive electrode active material for a lithium secondary battery, which is in the form of particles, and includes a lithium-containing composite metal compound in the form of secondary particles that are aggregates of primary particles capable of being doped and undoped with lithium ions, each of the secondary particles having on its surface a coating layer which includes a metal composite oxide comprising lithium and zirconium, and has a lithium ion conductivity, wherein the positive electrode active material includes at least nickel and zirconium as non-lithium metals, has a lithium carbonate content of 0.3% by mass or less and a lithium hydroxide content of 0.3% by mass or less, and satisfies all of requirements (1) to (2) below:

(1) [Ave($ZR_5/ZR_{10}$)]/[σ($ZR_5/ZR_{10}$)], which is a reciprocal of coefficient of variation [σ($ZR_5/ZR_{10}$)]/[Ave($ZR_5/ZR_{10}$)], is 1.0 or more, wherein:

ZR is a ratio of a detection intensity of zirconium and a detection intensity of nickel (detection intensity of zirconium/detection intensity of nickel), each measured by scanning electron microscopy-energy dispersive X-ray spectroscopy (SEM-EDX) with respect to surfaces of the particles of the positive electrode active material for a lithium secondary battery, $ZR_5$ is ZR when the SEM-EDX is performed at an acceleration voltage of 5 kV, $ZR_{10}$ is ZR when the SEM-EDX is performed at an acceleration voltage of 10 kV,

[Ave($ZR_5/ZR_{10}$)] is an average of values of a ratio of the $ZR_5$ to the $ZR_{10}$ [$ZR_5/ZR_{10}$],

[σ($ZR_5/ZR_{10}$)] is a standard deviation of values of a ratio of the $ZR_5$ to the $ZR_{10}$ [$ZR_5/ZR_{10}$], and

[σ($ZR_5/ZR_{10}$)]/[Ave($ZR_5/ZR_{10}$)] is a coefficient of variation calculated from the ratio average and the standard deviation, and (2) an average value of $ZR_5$ is 0.002 or more.

[13] A positive electrode active material for a lithium secondary battery, which is in the form of particles, and includes a lithium-containing composite metal compound in the form of secondary particles that are aggregates of primary particles capable of being doped and undoped with lithium ions, each of the secondary particles having on its surface a coating layer which includes a metal composite oxide comprising lithium and tungsten, and has a lithium ion conductivity, wherein the positive electrode active material includes at least nickel and tungsten as non-lithium metals, has a lithium carbonate content of 0.3% by mass or less and a lithium hydroxide content of 0.3% by mass or less, and satisfies all of requirements (1) to (2) below:

(1) [Ave(WR3/WR10)]/[σ(WR3/WR10)], which is a reciprocal of coefficient of variation [σ(WR3/WR10)]/[Ave (WR3/WR10)], is 2.5 or more, wherein:

WR is a ratio of a detection intensity of tungsten and a detection intensity of nickel (detection intensity of tungsten/detection intensity of nickel), each measured by scanning electron microscopy-energy dispersive X-ray spectroscopy (SEM-EDX) with respect to surfaces of the particles of the positive electrode active material for a lithium secondary battery, $WR_3$ is WR when the SEM-EDX is performed at an acceleration voltage of 3 kV, $WR_{10}$ is WR when the SEM-EDX is performed at an acceleration voltage of 10 kV,

[Ave($WR_3/WR_{10}$)] is an average of values of a ratio of the WR3 to the $WR_{10}$ [$WR_3/WR_{10}$],

[σ($WR_3/WR_{10}$)] is a standard deviation of values of a ratio of the $WR_3$ to the $WR_{10}$ [$WR_3/WR_{10}$], and

[σ($WR_3/WR_{10}$)]/[Ave($WR_3/WR_{10}$)] is a coefficient of variation calculated from the ratio average and the standard deviation, and (2) an average value of WR3 is 0.005 or more.

Effect of the Invention

The present invention can provide a positive electrode active material for a lithium secondary battery that suffers less generation of gas and suppresses battery swelling, a positive electrode using the same, and a non-aqueous electrolyte secondary battery using the same.

DESCRIPTION OF THE EMBODIMENTS

Figure 1A:
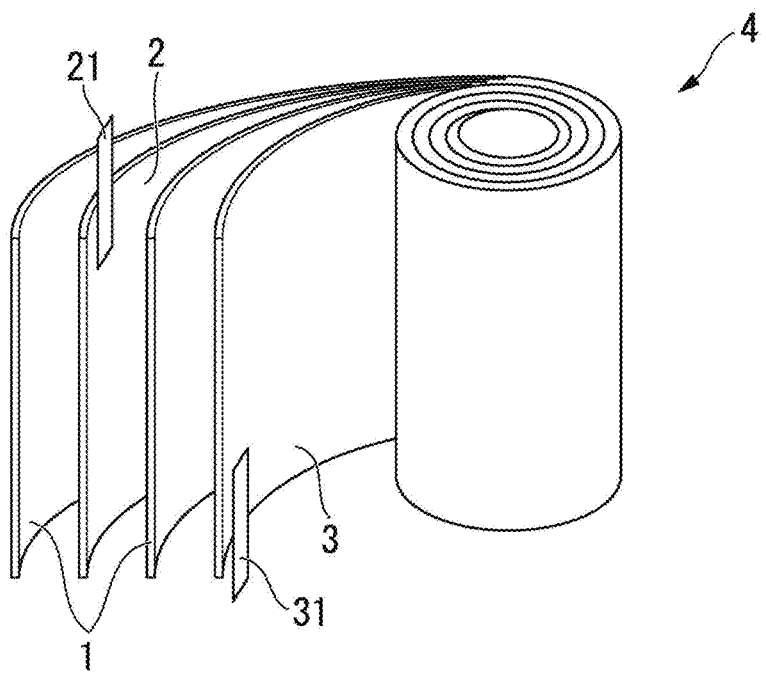
FIG. 1A is a schematic view showing one example of a lithium ion secondary battery.

Positive Electrode Active Material for Lithium Secondary Battery

First Embodiment

The present embodiment relates to a positive electrode active material for a lithium secondary battery, which is in the form of particles, and includes a lithium-containing composite metal compound in the form of secondary particles that are aggregates of primary particles capable of being doped and undoped with lithium ions, each of the secondary particles having on its surface a coating layer including a metal composite oxide including lithium and aluminum. The positive electrode active material of the present embodiment includes at least nickel and aluminum as non-lithium metals. Further, the positive electrode active material of the present embodiment satisfies all of requirements (1) to (2) below:

(1) [Ave(AR3/AR10)]/[σ(AR3/AR10)], which is a reciprocal of coefficient of variation [σ(AR3/AR10)]/[Ave(AR3/AR10)], is 6.1 or more, wherein:

AR is a ratio of a detection intensity of aluminum and a detection intensity of nickel (detection intensity of aluminum/detection intensity of nickel), each measured by scanning electron microscopy-energy dispersive X-ray spectroscopy (SEM-EDX) with respect to surfaces of the particles of the positive electrode active material for a lithium secondary battery, $AR_3$ is AR when the SEM-EDX is performed at an acceleration voltage of 3 kV, $AR_{10}$ is AR when the SEM-EDX is performed at an acceleration voltage of 10 kV,

[Ave($AR_3/AR_{10}$)] is an average of values of a ratio of the $AR_3$ to the $AR_{10}$ [$AR_3/AR_{10}$],

[σ($AR_3/AR_{10}$)] is a standard deviation of values of a ratio of the $AR_3$ to the $AR_{10}$ [$AR_3/AR_{10}$], and

[σ($AR_3/AR_{10}$)]/[Ave($AR_3/AR_{10}$)] is a coefficient of variation calculated from the ratio average and the standard deviation, and (2) an average value of $AR_3$ is 0.025 or more.

The positive electrode active material for a lithium secondary battery according to the present embodiment has a coating layer including a metal composite oxide comprising lithium and aluminum, provided on the surface of the lithium-containing composite metal compound.

Hereinbelow, requirements to be satisfied by the positive electrode active material for a lithium secondary battery according to the present embodiment are explained.

[Requirement (1)]

The positive electrode active material for a lithium secondary battery according to the present embodiment has a specific ratio, AR, of a detection intensity of aluminum and a detection intensity of nickel, when measured by scanning electron microscopy-energy dispersive X-ray spectroscopy (SEM-EDX) under the following conditions with respect to surfaces of the particles of the positive electrode active material. Incidentally, the positive electrode active material for a lithium secondary battery according to the present embodiment has a coating layer provided on the surface of the lithium-containing composite metal compound. Therefore, the positive electrode active material having a coating layer as such is subjected to the measurement.

In the present embodiment, the apparatus used for the measurement of the requirement (1) is not limited as long as the apparatus can irradiate an electron beam under conditions of acceleration voltages of 3 kV and 10 kV. In the present embodiment, it is preferable to use the following apparatus for the scanning electron microscopy-energy dispersive X-ray spectroscopy (SEM-EDX): product name S-4800, manufactured by Hitachi High-Technologies Corporation, which is mounted with an energy dispersive X-ray analyzer, X-Max$^N$, manufactured by Oxford Instruments.

Measurement Method

First, a carbon tape is affixed on a sample stage of a scanning electron microscope, and positive electrode active material particles are placed thereon. The sample stage is preferably made of carbon.

The positive electrode active material particles placed as described above are irradiated with electron beam under the conditions of an acceleration voltage of 3 kV or 10 kV and an operating distance of 15 mm, to determine detection intensities of characteristic X-rays with respect to aluminum and nickel. The characteristic X-ray for aluminum is a Kα ray. The characteristic X-ray for nickel is Lα ray.

Here, the ratio of a detection intensity of aluminum and a detection intensity of nickel (detection intensity of aluminum/detection intensity of nickel) is defined as AR.

Further, the value of AR when the SEM-EDX is performed at an acceleration voltage of 3 kV is defined as $AR_3$. The value of AR when the SEM-EDX is performed at an acceleration voltage of 10 kV is defined as $AR_{10}$.

Here, the measurement at the acceleration voltage of 3 kV is highly sensitive to the composition in the vicinity of the surface of the positive electrode active material particle, and $AR_3$ represents a value strongly reflecting the amount of aluminum present in the vicinity of the surface (i.e., the coating layer) of the positive electrode active material particle.

In the measurement at the acceleration voltage of 10 kV, the detectable region reaches into the inner part of the positive electrode active material particle, and therefore $AR_{10}$ represents a value reflecting the amount of aluminum present in the particle as a whole including the vicinity of the surface of the positive electrode active material particle.

First, the values of $[AR_3/AR_{10}]$, each of which is a ratio between $AR_3$ and $AR_{10}$, are obtained.

Then, an average value $[Ave(AR_3/AR_{10})]$ of values of the ratio $[AR_3/AR_{10}]$ is obtained. For example, the average value is preferably an average of the values measured with respect to 20 particles of the positive electrode active material. In addition to the calculation of the average value, a standard deviation $[\sigma(AR_3/AR_{10})]$ of the values of the ratio $[AR_3/AR_{10}]$ is also calculated.

Then, from the average and the standard deviation, a coefficient of variation $[\sigma(AR_3/AR_{10})]/[Ave(AR_3/AR_{10})]$ is calculated.

Then, a reciprocal of the coefficient of variation, i.e., $[Ave(AR_3/AR_{10})]/[\sigma(AR_3/AR_{10})]$ is calculated.

In the present embodiment, the reciprocal $[Ave(AR_3/AR_{10})]/[\sigma(AR_3/AR_{10})]$ as calculated above is 6.1 or more.

The measurement is to be performed on the precondition that $AR_3$ and $AR_{10}$ are measured in the same region on the particle surface of the positive electrode active material for a lithium secondary battery. That is, the aforementioned $AR_3$ and $AR_{10}$ are measured by irradiating the same surface region in the same particle with an electron beam.

In the present embodiment, the reciprocal $[Ave(AR_3/AR_{10})]/[\sigma(AR_3/AR_{10})]$ is preferably 6.2 or more, more preferably 6.3 or more, and still more preferably 6.4 or more.

The reciprocal $[Ave(AR_3/AR_{10})]/[\sigma(AR_3/AR_{10})]$ can be relied upon to judge whether or not aluminum is dispersed uniformly. Specifically, larger value of this reciprocal indicates more uniform distribution of the amount of aluminum present in the vicinity of the surface (i.e., the coating layer) of the positive electrode active material particles.

It is considered that the uniform presence of a certain amount of aluminum on the particle surface of the positive electrode active material reduces an uncoated region or a region where the coating layer is thin. Presumably because of this, the positive electrode active material of the present embodiment can suppress generation of gas resulting from the contact with the electrolytic solution, so that the swelling of a battery can be suppressed.

[Requirement (2)]

In the present embodiment, the average value of $AR_3$ is preferably 0.025 or more, more preferably 0.027 or more, still more preferably 0.03 or more, and particularly preferably 0.035 or more.

The average value of $AR_3$ not less than the lower limit value indicates that a large amount of aluminum is distributed in the vicinity of the surface (i.e., the coating layer) of the positive electrode active material particle.

Coating Layer

The positive electrode active material according to the present embodiment has a coating layer including a metal composite oxide including lithium and aluminum. The coating layer preferably has a lithium ion conductivity. In the present embodiment, the entire surface of the lithium-containing composite metal compound is covered with the coating layer. However, as long as the requirements (1) and (2) are satisfied, the surface of the lithium-containing composite metal compound may not be entirely covered with the coating layer, and uncoated region may be present on the surface.

The coating layer includes a metal composite oxide of lithium and aluminum.

The metal composite oxide of lithium and aluminum is a compound having a lithium ion conductivity. As such a compound having a lithium ion conductivity, at least one compound selected from the group consisting of $LiAlO_2$, $Li_5AlO_4$, and $LiAl_5O_8$ is preferable, $LiAlO_2$ is more preferable, α-$LiAlO_2$ is particularly preferable.

The coating layer may contain a lithium-containing composite metal compound or a product obtained by partial reaction between a lithium-containing composite metal compound and a metal composite oxide of lithium and aluminum. The effect of the present invention can be achieved as long as the metal composite oxide of lithium and aluminum is contained in an amount of at least 30% or more.

The coating layer contains a metal composite oxide of lithium and aluminum in an amount of preferably 50% or more, more preferably 70% or more, and still more preferably 90% or more.

As for the aluminum in the coating layer, aluminum oxide, aluminum hydroxide, or aluminum nitrate can be used as a raw material. From the viewpoint of promoting the uniform formation of the uniform coating layer, the raw material containing aluminum preferably has a BET specific surface area of 10 $m^2/g$ or more, and more preferably 30 $m^2/g$ or more.

In the positive electrode active material for a lithium secondary battery according to the present embodiment, the coating layer has a lithium ion conductivity. This enables the suppression of destabilization of the crystal structure caused by hindered reversible insertion and desorption of lithium ions. As a result, battery swelling due to gas generation resulting from the decomposition of the electrolyte can be suppressed.

Second Embodiment

In the present embodiment, a coating layer including a metal composite oxide including lithium and zirconium is provided on the surface of a lithium-containing composite metal compound in the form of secondary particles that are aggregates of primary particles capable of being doped and undoped with lithium ions. The positive electrode active material according to the present embodiment includes at least nickel and zirconium as non-lithium metals. Further, the positive electrode active material according to the present embodiment satisfies all of requirements (1) to (2) below:

(1) $[Ave(ZR_5/ZR10)]/[\sigma(ZR_5/ZR_{10})]$, which is a reciprocal of coefficient of variation $[\sigma(ZR_5/ZR10)]/[Ave(ZR_5/ZR_{10})]$, is 1.0 or more, wherein:

ZR is a ratio of a detection intensity of zirconium and a detection intensity of nickel (detection intensity of zirconium/detection intensity of nickel), each measured by scanning electron microscopy-energy dispersive X-ray spectroscopy (SEM-EDX) with respect to surfaces of the particles of the positive electrode active material for a lithium secondary battery, $ZR_5$ is ZR when the SEM-EDX is performed at an acceleration voltage of 5 kV, $ZR_{10}$ is ZR when the SEM-EDX is performed at an acceleration voltage of 10 kV, $[Ave(ZR_5/ZR_{10})]$ is an average of values of a ratio of the $ZR_5$ to the $ZR_{10}$ $[ZR_5/ZR_{10}]$, $[\sigma(ZR_5/ZR_{10})]$ is a standard deviation of values of a ratio of the $ZR_5$ to the $ZR_{10}$ $[ZR_5/ZR_{10}]$, and $[\sigma(ZR_5/ZR10)]/[Ave(ZR_5/ZR10)]$ is a coefficient of variation calculated from the ratio average and the standard deviation, and (2) an average value of $ZR_5$ is 0.002 or more.

The positive electrode active material for a lithium secondary battery according to the present embodiment has a coating layer including a metal composite oxide including lithium and zirconium, provided on the surface of the lithium-containing composite metal compound.

Hereinbelow, requirements to be satisfied by the positive electrode active material for a lithium secondary battery according to the present embodiment are explained.

[Requirement (1)]

The positive electrode active material for a lithium secondary battery according to the present embodiment has a specific ratio, ZR, of a detection intensity of zirconium and a detection intensity of nickel, when measured by scanning electron microscopy-energy dispersive X-ray spectroscopy (SEM-EDX) under the following conditions with respect to surfaces of the particles of the positive electrode active material. Incidentally, the positive electrode active material for a lithium secondary battery according to the present embodiment has a coating layer provided on the surface of the lithium-containing composite metal compound. Therefore, the positive electrode active material having a coating layer as such is subjected to the measurement.

Measurement Method

First, a carbon tape is affixed on a sample stage of a scanning electron microscope, and positive electrode active material particles are placed thereon. The sample stage is preferably made of carbon.

The positive electrode active material particle placed as described above is irradiated with electron beam under the conditions of an acceleration voltage of 5 kV or 10 kV and an operating distance of 15 mm, to determine detection intensities of characteristic X-rays with respect to zirconium and nickel. The characteristic X-rays for zirconium are $L\alpha$ ray and $L\beta$ ray. $L\alpha$ ray and $L\beta$ ray are close in energy and are detected as one peak in the SEM-EDX measurement. The characteristic X-ray for nickel is $L\alpha$ ray.

Here, the ratio of a detection intensity of zirconium and a detection intensity of nickel (detection intensity of zirconium/detection intensity of nickel) is defined as ZR.

Further, the value of ZR when the SEM-EDX is performed at an acceleration voltage of 5 kV is defined as $ZR_5$. The value of ZR when the SEM-EDX is performed at an acceleration voltage of 10 kV is defined as $ZR_{10}$.

Here, the measurement at the acceleration voltage of 5 kV is highly sensitive to the composition in the vicinity of the surface of the positive electrode active material particle, and $ZR_5$ represents a value strongly reflecting the amount of zirconium present in the vicinity of the surface (i.e., the coating layer) of the positive electrode active material particle.

In the measurement at the acceleration voltage of 10 kV, the detectable region reaches into the inner part of the positive electrode active material particle, and therefore $ZR_{10}$ represents a value reflecting the amount of zirconium present in the particle as a whole including the vicinity of the surface of the positive electrode active material particle.

First, the values of $[ZR_5/ZR_{10}]$, each of which is a ratio between $ZR_5$ and $ZR_{10}$, are obtained.

Then, an average value $[Ave(ZR_5/ZR_{10})]$ of values of the ratio $[ZR_5/ZR_{10}]$ is obtained. For example, the average value is preferably an average of the values measured with respect to 20 particles of the positive electrode active material. In addition to the calculation of the average value, a standard deviation $[\sigma(ZR_5/ZR_{10})]$ of the values of the ratio $[ZR_5/ZR_{10}]$ is also calculated.

Then, from the average and the standard deviation, a coefficient of variation $[\sigma(ZR_5/ZR_{10})]/[Ave(ZR_5/ZR_{10})]$ is calculated.

Then, a reciprocal of the coefficient of variation, i.e., $[Ave(ZR_5/ZR_{10})]/[\sigma(ZR_5/ZR_{10})]$ is calculated.

In the present embodiment, the reciprocal $[Ave(ZR_5/ZR_{40})]/[\sigma(ZR_5/ZR_{10})]$ as calculated above is 1.0 or more.

The measurement is to be performed on the precondition that $ZR_5$ and $ZR_{10}$ are measured in the same region on the particle surface of the positive electrode active material for a lithium secondary battery. That is, the aforementioned $ZR_5$ and $ZR_{10}$ are measured by irradiating the same surface region in the same particle with an electron beam.

In the present embodiment, the reciprocal $[Ave(ZR_5/ZR_{10})]/[\sigma(ZR_5/AR_{10}]$ is preferably 1.5 or more, more preferably 2.5 or more, and still more preferably 3.0 or more.

The reciprocal $[Ave(ZR_5/ZR_{10})]/[\sigma(ZR_5/ZR_{10})]$ can be relied upon to judge whether or not zirconium is dispersed uniformly. Specifically, larger value of this reciprocal indicates more uniform distribution of the amount of zirconium present in the vicinity the surface (i.e., the coating layer) of the positive electrode active material particles.

It is considered that the uniform presence of a certain amount of zirconium on the particle surface of the positive electrode active material reduces an uncoated region or a region where the coating layer is thin. Presumably because of this, the positive electrode active material of the present embodiment can suppress generation of gas resulting from the contact with the electrolytic solution, so that the swelling of a battery can be suppressed.

[Requirement (2)]

In the present embodiment, the average value of $ZR_5$ is preferably 0.002 or more, more preferably 0.005 or more, still more preferably 0.007 or more, and particularly preferably 0.010 or more.

The average value of $ZR_5$ not less than the lower limit value indicates that a large amount of zirconium is distributed in the vicinity of the surface (i.e., the coating layer) of the positive electrode active material particle.

Coating Layer

The positive electrode active material according to the present embodiment has a coating layer including a metal composite oxide including lithium and zirconium. The coating layer preferably has a lithium ion conductivity. In the present embodiment, the entire surface of the lithium-containing composite metal compound is covered with the coating layer. However, as long as the requirements (1) and (2) are satisfied, the surface of the lithium-containing composite metal compound may not be entirely covered with the coating layer, and uncoated region may be present on the surface.

The coating layer includes a metal composite oxide of lithium and zirconium.

The metal composite oxide of lithium and zirconium is a compound having a lithium ion conductivity. As such a compound having a lithium ion conductivity, $Li_2ZrO_3$ or $Li_4ZrO_4$ is preferable and, $Li_2ZrO_3$ is more preferable. The coating layer may contain a lithium-containing composite metal compound or a product obtained by partial reaction between a lithium-containing composite metal compound and a metal composite oxide of lithium and zirconium. The effect of the present invention can be achieved as long as the metal composite oxide of lithium and zirconium is contained in an amount of at least 30% or more. The coating layer contains a metal composite oxide of lithium and zirconium in an amount of preferably 50% or more, more preferably 70% or more, and still more preferably 90% or more.

As for the zirconium in the coating layer, zirconium oxide can be used as a raw material. From the viewpoint of promoting the uniform formation of the uniform coating layer, the raw material containing zirconium preferably has a BET specific surface area of 10 m$^2$/g or more, and more preferably 30 m$^2$/g or more.

In the positive electrode active material for a lithium secondary battery according to the present embodiment, the coating layer has a lithium ion conductivity. This enables the suppression of destabilization of the crystal structure caused by hindered reversible insertion and desorption of lithium ions. As a result, battery swelling due to gas generation resulting from the decomposition of the electrolyte can be suppressed.

Third Embodiment

In the present embodiment, a coating layer including a metal composite oxide including lithium and tungsten is provided on the surface of a lithium-containing composite metal compound in the form of secondary particles that are aggregates of primary particles capable of being doped and undoped with lithium ions. The positive electrode active material of the present embodiment includes at least nickel and tungsten as non-lithium metals. The positive electrode active material of the present embodiment satisfies all of requirements (1) to (2) below:

(1) $[Ave(WR_3/WR_{10})]/[\sigma(WR_3/WR_{10})]$, which is a reciprocal of coefficient of variation $[\sigma(WR_3/WR_{10})]/[Ave(WR_3/WR_{10})]$, is 2.5 or more, wherein:

WR is a ratio of a detection intensity of tungsten and a detection intensity of nickel (detection intensity of tungsten/detection intensity of nickel), each measured by scanning electron microscopy-energy dispersive X-ray spectroscopy (SEM-EDX) with respect to surfaces of the particles of the positive electrode active material for a lithium secondary battery, $WR_3$ is WR when the SEM-EDX is performed at an acceleration voltage of 3 kV, $WR_{10}$ is WR when the SEM-EDX is performed at an acceleration voltage of 10 kV, $[Ave(WR_3/WR_{10})]$ is an average of values of a ratio of the $WR_3$ to the $WR_{10}$ $[WR_3/WR_{10}]$, $[\sigma(WR_3/WR_{10})]$ is a standard deviation of values of a ratio of the $WR_3$ to the $WR_{10}$ $[WR_3/WR_{10}]$, and $[\sigma(WR_3/WR_{10})]/[Ave(WR_3/WR_{10})]$ is a coefficient of variation calculated from the ratio average and the standard deviation, and (2) an average value of $WR_3$ is 0.005 or more.

The positive electrode active material for a lithium secondary battery according to the present embodiment has a coating layer including a metal composite oxide comprising lithium and tungsten, provided on the surface of the lithium-containing composite metal compound.

Hereinbelow, requirements to be satisfied by the positive electrode active material for a lithium secondary battery according to the present embodiment are explained.

[Requirement (1)]

The positive electrode active material for a lithium secondary battery according to the present embodiment has a specific ratio, WR, of a detection intensity of tungsten and a detection intensity of nickel, when measured by scanning electron microscopy-energy dispersive X-ray spectroscopy (SEM-EDX) under the following conditions with respect to surfaces of the particles of the positive electrode active material. Incidentally, the positive electrode active material for a lithium secondary battery according to the present embodiment has a coating layer provided on the surface of the lithium-containing composite metal compound. Therefore, the positive electrode active material having a coating layer as such is subjected to the measurement.

Measurement Method

First, a carbon tape is affixed on a sample stage of a scanning electron microscope, and positive electrode active material particles are placed thereon. The sample stage is preferably made of carbon.

The positive electrode active material particle disposed as described above is irradiated with electron beam under the conditions of an acceleration voltage of 3 kV or 10 kV and an operating distance of 15 mm, to determine detection intensities of characteristic X-rays with respect to tungsten and nickel. The characteristic X-rays for tungsten are Mα ray and Mβ ray. Mα ray and Mβ ray are close in energy and are detected as one peak in the SEM-EDX measurement. The characteristic X-ray for nickel is Lα ray.

Here, the ratio of a detection intensity of tungsten and a detection intensity of nickel (detection intensity of tungsten/detection intensity of nickel) is defined as WR.

Further, the value of WR when the SEM-EDX is performed at an acceleration voltage of 3 kV is defined as $WR_3$. The value of WR when the SEM-EDX is performed at an acceleration voltage of 10 kV is defined as $WR_{10}$.

Here, the measurement at the acceleration voltage of 3 kV is highly sensitive to the composition in the vicinity of the surface of the positive electrode active material particle, and $WR_3$ represents a value strongly reflecting the amount of tungsten present in the vicinity of the surface (i.e., the coating layer) of the positive electrode active material particle.

In the measurement at the acceleration voltage of 10 kV, the detectable region reaches into the inner part of the positive electrode active material particle, and therefore $WR_{10}$ represents a value reflecting the amount of tungsten present in the particle as a whole including the vicinity of the surface of the positive electrode active material particle.

First, the value of $[WR_3/WR_{10}]$, which is a ratio between WR3 and $WR_{10}$, is obtained.

Then, an average value $[Ave(WR_3/WR_{10})]$ of values of the ratio $[WR_3/WR_{10}]$ is obtained. For example, the average value is preferably an average of the values measured with respect to 20 particles of the positive electrode active material. In addition to the calculation of the average value, a standard deviation $[\sigma(WR_3/WR_{10})]$ of the values of the ratio $[WR_3/WR_{10}]$ is also calculated.

Then, from the ratio average and the standard deviation, a coefficient of variation $[\sigma(WR_3/WR_{10})]/[Ave(WR_3/WR_{10})]$ is calculated.

Then, a reciprocal of the coefficient of variation, i.e., $[Ave(WR_3/WR_{10})]/[\sigma(WR_3/WR_{10})]$ is calculated.

In the present embodiment, the reciprocal $[Ave(WR_3/WR_{10})]/[\sigma(WR_3/WR_{10})]$ as calculated above is 2.5 or more.

The measurement is to be performed on the precondition that $WR_3$ and $WR_{10}$ are measured in the same region on the particle surface of the positive electrode active material for a lithium secondary battery. That is, the aforementioned $WR_3$ and $WR_{10}$ are measured by irradiating the same surface region in the same particle with an electron beam.

In the present embodiment, the reciprocal $[Ave(WR_3/WR_{10})]/[\sigma(WR_3/WR_{10})]$ is preferably 2.6 or more, more preferably 3.5 or more, and still more preferably 4.5 or more.

The reciprocal $[Ave(WR_3/WR_{10})]/[\sigma(WR_3/WR_{10})]$ can be relied upon to judge whether or not tungsten is dispersed uniformly. Specifically, larger value of this reciprocal indicates more uniform distribution of the amount of tungsten present in the vicinity the surface (i.e., the coating layer) of the positive electrode active material particles.

It is considered that the uniform presence of a certain amount of tungsten on the particle surface of the positive electrode active material reduces an uncoated region or a region where the coating layer is thin. Presumably because of this, the positive electrode active material of the present embodiment can suppress generation of gas resulting from the contact with the electrolytic solution, so that the swelling of a battery can be suppressed.

[Requirement (2)]

In the present embodiment, the average value of $WR_3$ is preferably 0.005 or more, more preferably 0.006 or more, still more preferably 0.010 or more, and particularly preferably 0.015 or more.

The average value of $WR_3$ not less than the lower limit value indicates that a large amount of tungsten is distributed in the vicinity of the surface (i.e., the coating layer) of the positive electrode active material particle.

Coating Layer

The positive electrode active material according to the present embodiment has a coating layer including a metal composite oxide including lithium and tungsten. The coating layer preferably has a lithium ion conductivity. In the present embodiment, the entire surface of the lithium-containing composite metal compound is covered with the coating layer. However, as long as the requirements (1) and (2) are satisfied, the surface of the lithium-containing composite metal compound may not be entirely covered with the coating layer, and uncoated region may be present on the surface.

The coating layer includes a metal composite oxide of lithium and tungsten.

The metal composite oxide of lithium and tungsten is a compound having a lithium ion conductivity. Such a compound having a lithium ion conductivity is preferably at least one compound selected from the group consisting of $Li_2WO_4$, $Li_4WO_5$, $Li_6W_2O_9$, $Li_2W_2O_7$ and $Li_2W_4O_{13}$, more preferably at least one compound selected from the group consisting of $Li_2WO_4$, $Li_4WO_5$ and $Li_6W_2O_9$, particularly preferably $Li_2WO_4$ or $Li_4WO_5$.

The coating layer may contain a lithium-containing composite metal compound or a product obtained by partial reaction between a lithium-containing composite metal compound and a metal composite oxide of lithium and tungsten. The effect of the present invention can be achieved as long as the metal composite oxide of lithium and tungsten is contained in an amount of at least 30% or more. The coating layer contains a metal composite oxide of lithium and tungsten in an amount of preferably 50% or more, more preferably 70% or more, and still more preferably 90% or more.

As for the tungsten in the coating layer, tungsten oxide can be used as a raw material. From the viewpoint of promoting the uniform formation of the uniform coating layer, the raw material containing tungsten preferably has a BET specific surface area of 0.5 $m^2/g$ or more, and more preferably 1 $m^2/g$ or more.

In the positive electrode active material for a lithium secondary battery according to the present embodiment, the coating layer has a lithium ion conductivity. This enables the suppression of destabilization of the crystal structure caused by hindered reversible insertion and desorption of lithium ions. As a result, battery swelling due to gas generation resulting from the decomposition of the electrolyte can be suppressed.

BET Specific Surface Area

In the first to third embodiments, the BET specific surface area of the positive electrode active material is preferably 0.1 $m^2/g$ or more, more preferably 0.2 $m^2/g$ or more, and particularly preferable 0.3 $m^2/g$ or more.

Also, the BET specific surface area is preferably 2.0 $m^2/g$ or less, more preferably 1.9 $m^2/g$ or less, and still more preferably 1.8 $m^2/g$ or less.

The upper limit values and lower limit values can be arbitrarily combined.

In the present embodiment, the BET specific surface area is preferably 0.1 m²/g or more and 2.0 m²/g or less, more preferably 0.2 m²/g or more and 1.0 m²/g or less, and still more preferably 0.3 m²/g or more and 1.8 m²/g or less.

The BET specific surface area within the above range allows the battery to have a higher capacity.

Lithium Carbonate Content

In the first to third embodiments, the lithium carbonate content is preferably 0.3% by mass or less, more preferably 0.2% by mass or less, and particularly preferably 0.15% by mass or less.

Lithium Hydroxide Content

In the first to third embodiments, the lithium hydroxide content is preferably 0.3% by mass or less, more preferably 0.2% by mass or less, and particularly preferably 0.15% by mass or less.

The lithium carbonate content and the lithium hydroxide content are determined in terms of converted values from the results of neutralization titration.

When the lithium carbonate content and the lithium hydroxide content are below the above upper limit values, generation of gas can be further suppressed.

Water Content

In the first to third embodiments, the water content is preferably 600 ppm or less, more preferably 590 ppm or less, and particularly preferably 580 ppm or less.

The water content can be measured using a coulometric Karl Fischer moisture meter (831 Coulometer, manufactured by Metrohm).

When the water content is below the above upper limit value, generation of gas can be further suppressed.

Lithium-Containing Composite Metal Compound

In the first to third embodiments, the lithium-containing composite metal compound preferably has an α-NaFeO2 type crystal structure represented by the following formula (A).

$$\text{Li}[\text{Li}_x(\text{Ni}_a\text{Co}_b\text{Mn}_c\text{M1}_d)_{1-x}]\text{O}_2 \quad (A)$$

wherein $-0.1 \leq x \leq 0.2$, $0.5 \leq a < 1$, $0 \leq b \leq 0.3$, $0 \leq c \leq 0.3$, $0 \leq d \leq 0.1$, $a+b+c+d=1$, M1 is at least one element selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.

In the positive electrode active material for a lithium secondary battery of the present embodiment, for obtaining a lithium secondary battery with higher cycle performance at high voltage, x in the formula (A) is preferably more than 0, more preferably 0.01 or more, still more preferably 0.02 or more.

For obtaining a lithium secondary battery with higher initial coulombic efficiency, x in the formula (A) is preferably 0.18 or less, more preferably 0.15 or less, and still more preferably 0.1 or less.

The upper limit values and lower limit values of x can be arbitrarily combined. As for the combination of the upper limit value and the lower limit value, it is preferable that $0 < x \leq 0.2$ is satisfied. More preferably, x is 0.01 or more and 0.18 or less, and particularly preferably, x is 0.02 or more and 0.15 or less.

In the present specification, the expression "high cycle performance" means that a discharge capacity retention is high.

Further, from the viewpoint of obtaining a lithium secondary battery having a high capacity, a in the formula (A) is preferably more than 0.70, more preferably 0.72 or more, and still more preferably 0.75 or more. Further, from the viewpoint of obtaining a lithium secondary battery having a high discharge capacity at a high current rate, a in the formula (A) is preferably 0.92 or less, more preferably 0.91 or less, and still more preferably 0.9 or less.

The upper limit values and lower limit values of a can be arbitrarily combined. In the present embodiment, as examples of the combination of the upper limit value and the lower limit value, a is preferably more than 0.70 and 0.92 or less, more preferably 0.72 or more and 0.91 or less, and still more preferably 0.75 or more and 0.9 or less.

For obtaining a lithium secondary battery with higher cycle performance at high voltage, b in the formula (A) is preferably 0.07 or more, more preferably 0.1 or more, and still more preferably 0.13 or more. Further, from the viewpoint of obtaining a lithium secondary battery having a high thermal stability, b in the formula (A) is preferably 0.25 or less, more preferably 0.23 or less, and still more preferably 0.20 or less.

The upper limit values and lower limit values of b can be arbitrarily combined.

In the present embodiment, as examples of the combination of the upper limit value and the lower limit value, b is preferably 0.07 or more and 0.25 or less, more preferably 0.1 or more and 0.23 or less, and still more preferably 0.13 or more and 0.20 or less.

For obtaining a lithium secondary battery with higher cycle performance at high voltage, c in the formula (A) is preferably 0.01 or more, more preferably 0.02 or more, still more preferably 0.03 or more. For obtaining a lithium secondary battery with higher storage stability under high temperature conditions (e.g., at 60° C.), c in the formula (A) is preferably 0.18 or less, more preferably 0.15 or less, and still more preferably 0.10 or less.

The upper limit values and lower limit values of c can be arbitrarily combined.

In the present embodiment, as examples of the combination of the upper limit value and the lower limit value, c is preferably 0.01 or more and 0.18 or less, more preferably 0.02 or more and 0.15 or less, and still more preferably 0.03 or more and 0.10 or less.

M1 in the formula (A) is at least one element selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.

For improving the handling of the positive electrode active material for a lithium secondary battery, d in the formula (A) is preferably more than 0, more preferably 0.001 or more, and still more preferably 0.003 or more. Further, from the viewpoint of obtaining a lithium secondary battery having a high discharge capacity at a high current rate, d in the formula (A) is preferably 0.08 or less, more preferably 0.07 or less, and still more preferably 0.06 or less.

The upper limit values and lower limit values of d can be arbitrarily combined. In the present embodiment, as examples of the combination of the upper limit value and the lower limit value, d is preferably more than 0 and 0.08 or less, more preferably 0.001 or more and 0.07 or less, and still more preferably 0.003 or more and 0.06 or less.

Further, from the viewpoint of obtaining a lithium secondary battery with higher cycle performance at high voltage, M1 in the formula (A) is preferably any one of Al, Zr, W, Mo, and Nb. From the viewpoint of obtaining a lithium secondary battery with high thermal stability, M1 is preferably any one of Mg, Al, Zr, and W.

In the first to third embodiments, the positive electrode active material for a lithium secondary battery includes a lithium-containing composite metal compound and a coating layer that coats the lithium-containing composite metal compound. In this instance, the lithium-containing composite metal compound preferably includes a compound containing at least lithium, nickel, and an element M2. Further, the coating layer preferably includes an element X and a compound having a lithium conductivity.

Such a positive electrode active material for a lithium secondary battery preferably has a composition represented by formula (I) below:

$$Li[Li_x(Ni_aCo_bMn_cM2_dX_e)_{1-x}]O_2 \quad (I)$$

wherein $-0.1 \leq x \leq 0.2$, $0.5 \leq a < 1$, $0 \leq b \leq 0.3$, $0 \leq c \leq 0.3$, $0 \leq d \leq 0.1$, $0 < e \leq 0.1$, $a+b+c+d+e=1$, M2 is at least one element selected from the group consisting of Mg, Ca, Sr, Ba, Zn, B, Ga, Ti, Ge, Fe, Cu, Cr, V, Sc, Y, La, Ta, Tc, Ru, Rh, Pd, Ag, Cd, In, and Sn, and X is at least one element selected from the group consisting of Al, Zr, W, Mo and Nb.

<Method for Producing Positive Electrode Active Material for Lithium Secondary Battery>

The method for producing the positive electrode active material for a lithium secondary battery according to the present invention preferably includes a step of producing a composite metal compound containing nickel, cobalt, and manganese, and a step of producing a lithium-containing composite metal compound using the composite metal compound and a lithium compound.

In producing the positive electrode active material for a lithium secondary battery according to the present invention, first, a composite metal compound is prepared, which contains, as metals other than lithium, at least Ni, and may also contain at least one optional metal selected from the group consisting of Co and Mn, and a group consisting of Fe, Cu, Ti, Mg, Al, W, B, Mo, Nb, Zn, Sn, Zr, Ga, and V. Thereafter, the composite metal compound is calcinated together with an appropriate lithium salt.

The composite metal compound is preferably a composite metal hydroxide or a composite metal oxide.

Hereinbelow, as to one example of the method for producing the positive electrode active material, explanations are made separately on the step of producing the metal composite compound and the step of producing the lithium-containing composite metal compound.

(Step of Producing Composite Metal Compound)

The composite metal compound can be produced by the conventionally known batch co-precipitation method or continuous co-precipitation method. Hereinbelow, the method for producing the composite metal compound is explained taking as an example the case of production of a composite metal hydroxide containing nickel, cobalt and manganese as metals.

First, a nickel salt solution, a cobalt salt solution, a manganese salt solution and a complexing agent are reacted by the co-precipitation method, especially, a continuous method described in Japanese Patent Unexamined Publication No. 2002-201028 to produce a nickel-cobalt-manganese composite metal hydroxide.

There is no particular limitation with respect to a nickel salt as a solute in the aforementioned nickel salt solution. For example, any of nickel sulfate, nickel nitrate, nickel chloride and nickel acetate can be used. As a cobalt salt as a solute in the cobalt salt solution, for example, any of cobalt sulfate, cobalt nitrate and cobalt chloride can be used. As a manganese salt as a solute in the manganese salt solution, for example, any of manganese sulfate, manganese nitrate and manganese chloride can be used. These metal salts are used in a ratio corresponding to the composition ratio of the formula (A) described above. As a solvent, water can be used.

The complexing agent is a substance capable of forming a complex with ions of nickel, cobalt and manganese in an aqueous solution, the examples of which include an ammonium ion donor (ammonium sulfate, ammonium chloride, ammonium carbonate, ammonium fluoride, etc.), hydrazine, ethylenediaminetetraacetic acid, nitrilotriacetic acid, uracil diacetate and glycine.

For adjusting the pH value of the aqueous solution during the precipitation, if necessary, an alkali metal hydroxide (such as sodium hydroxide or potassium hydroxide) may be added.

The reaction is performed with the temperature in the reaction vessel being regulated, for example, within the range of 20° C. to 80° C., preferably 30° C. to 70° C.

As for the pH value in the reaction vessel, the pH value is regulated, for example, within the range of 9 to 13, and preferably 11 to 13, when the temperature of the aqueous solution is 40° C.

The content of the reaction vessel is appropriately stirred. With respect to the reaction vessel, one which allows the overflow for separation of the precipitated reaction product can be used.

Successive addition of the aforementioned nickel salt solution, cobalt salt solution and manganese salt solution as well as the complexing agent to a reaction vessel allows nickel, cobalt and manganese to react with each other, resulting in the generation of a nickel-cobalt-manganese composite metal hydroxide.

The reaction is performed with the temperature in the reaction vessel being regulated, for example, within the range of 20° C. to 80° C., preferably 30° C. to 70° C.

As for the pH value in the reaction vessel, the pH value is regulated, for example, within the range of 9 to 13, and preferably 11 to 13, when the temperature of the aqueous solution is 40° C. By controlling the pH within the above range, secondary particles having high surface reactivity desired in the present invention can be produced.

The content of the reaction vessel is appropriately stirred. It is preferable to mix and stir the solutions under the condition that the weight ratio (calculated in terms of respective metals) of total of nickel, cobalt and manganese relative to the alkali metal hydroxide is 0.9 or more, while keeping the temperature of the reaction vessel at 40° C. or higher. This allows the control of the sphericity of the secondary particles to increase the sphericity. Higher sphericity can make it easier to mix uniformly the lithium-containing composite metal compound and the coating material in the step of forming the coating layer to be described later. With respect to the reaction vessel, one which allows the overflow for separation of the precipitated reaction product can be used.

In addition, the reaction between the lithium-containing composite metal compound and the coating material can be facilitated in the step of forming the coating layer to be described later by performing the reaction in an appropriate oxygen-containing atmosphere or in the presence of an oxidizing agent, while maintaining an inert atmosphere in the reaction vessel. For introducing oxygen into the atmosphere inside the reaction vessel, an oxygen-containing gas may be introduced into the reaction vessel. Examples of the oxygen-containing gas include oxygen gas, air, and a mixed gas thereof with oxygen-free gas such as nitrogen gas. From the viewpoint of easy adjustment of the oxygen concentration of the oxygen-containing gas, the mixed gas is preferable among those exemplified above.

With respect to various properties of the positive electrode active material to be finally obtained, desired properties can be controlled by appropriately adjusting the concentrations of the metal salts to be supplied to the reaction vessel, agitation speed, reaction temperature, reaction pH, and calcination conditions described below, and the like.

After the reaction as described above, the resulting precipitate of the reaction product is washed with water and, then, dried, followed by isolation of a nickel-cobalt-manganese composite hydroxide as the nickel-cobalt-manganese composite compound. If necessary, the resulting may be rinsed with weak acid water or an alkaline solution containing sodium hydroxide or potassium hydroxide. In the above example, a nickel-cobalt-manganese composite hydroxide is produced; however, a nickel-cobalt-manganese composite oxide may be produced instead. For example, a nickel-cobalt-manganese composite oxide can be produced by calcinating a nickel-cobalt-manganese composite hydroxide. The calcination time is preferably 1 hour or more and 30 hours or less as the total time from starting to raise the temperature until the end of temperature holding. The heating rate in the heating step where the temperature reaches the highest holding temperature is preferably 180° C./hour or more, more preferably 200° C./hour or more, and particularly preferably 250° C./hour or more. For preparing the nickel-cobalt-manganese composite oxide from the nickel-cobalt-manganese composite hydroxide, an oxidation step may be implemented by calcination at a temperature of 300° C. or higher and 800° C. or lower for 1 hour or more and 10 hours or less.

(Step of Producing Lithium-Containing Composite Metal Compound)

Mixing Step

After drying the composite metal oxide or the composite metal hydroxide, the dried product is mixed with a lithium salt.

As the lithium salt, any of lithium carbonate, lithium nitrate, lithium acetate, lithium hydroxide, lithium hydroxide hydrate and lithium oxide may be used individually or in the form of a mixture of two or more of these lithium salts.

After drying the composite metal oxide or the composite metal hydroxide, the resulting may be subjected to appropriate classification. The aforementioned lithium salt and the composite metal hydroxide are used in respective amounts determined in view of the composition ratio of the end product. For example, when using a nickel-cobalt-manganese composite metal hydroxide, the lithium salt and the composite metal hydroxide are used in a ratio corresponding to the composition ratio of the formula (A) described above.

Calcination Step

By calcining a mixture of the nickel-cobalt-manganese composite metal oxide or hydroxide and the lithium salts, a lithium-nickel-cobalt-manganese composite metal compound can be obtained. The calcination may be carried out in dried air, an oxygen atmosphere, an inert atmosphere or the like depending on the desired composition, and may include a final calcination step including multiple heating steps if necessary.

The temperature for calcination of the aforementioned composite metal oxide or composite metal hydroxide and lithium compounds such as lithium hydroxide or lithium carbonate is not particularly limited, but is preferably 700° C. to 1100° C., more preferably 750° C. to 1050° C., and still more preferably 800° C. to 1025° C. Here, the calcination temperature is the highest temperature of the holding temperatures in the final calcination step (hereinafter, also referred to as "highest holding temperature"), and in the case of final calcination step including multiple heating steps, the calcination temperature means the highest holding temperature of those in the multiple heating steps.

The calcination time is preferably 3 hours or more and 50 hours or less. The calcination time exceeding 50 hours tends to result in substantially lower battery performance due to volatilization of lithium. The calcination time less than 3 hours tends to result in a poor crystal growth and an inferior battery performance.

In the present embodiment, the heating rate in the heating step where the temperature reaches the highest holding temperature is preferably 180° C./hour or more, more preferably 200° C./hour or more, and particularly preferably 250° C./hour or more. The heating rate in the heating step where the temperature reaches the highest holding temperature is calculated from the time from starting to raise the temperature until the temperature reaches the holding temperature described later.

By setting the heating rate within the above specific range, a lithium-containing composite metal compound exhibiting high surface reactivity on the secondary particles thereof can be produced.

Rinsing Step After the calcination, the resulting calcinated product may be rinsed. For rinsing, pure water or an alkaline rinsing solution can be used.

Examples of the alkaline rinsing solution include aqueous solutions of anhydrides and hydrates of at least one compound selected from the group consisting of LiOH (lithium hydroxide), NaOH (sodium hydroxide), KOH (potassium hydroxide), $Li_2CO_3$ (lithium carbonate), $Na_2CO_3$ (sodium carbonate), $K_2CO_3$ (potassium carbonate), and $(NH_4)_2CO_3$ (ammonium carbonate). Ammonia can also be used as an alkali component of the alkaline rinsing solution.

Examples of the method for bringing the rinsing solution into contact with the lithium-containing composite metal compound in the rinsing step include the following methods:

a method in which the lithium-containing composite metal compound is charged into an aqueous solution as the rinsing solution, followed by stirring;

a method in which an aqueous solution as the rinsing solution is sprayed as shower water to the lithium-containing composite metal compound; and a method in which the lithium-containing composite metal compound is added to an aqueous solution as the rinsing solution, followed by stirring; the lithium-containing composite metal compound is separated from the aqueous solution; and, then, an aqueous solution as the rinsing solution is sprayed as shower water to the separated lithium-containing composite metal compound.

Step of Forming Coating Layer

For forming a coating layer on the surface of the lithium-containing composite metal compound, first, a coating material and a lithium-containing composite metal compound are mixed. A coating layer containing a metal composite oxide can be formed on the surfaces of the primary particles or secondary particles of the lithium-containing composite metal compound by subjected the resulting mixture to a heat treatment as necessary.

Depending on the type of the coating material, the coating material may be added and mixed in the mixing step of mixing the composite metal compound and the lithium salt. Thus, the coating layer containing a metal composite oxide can be formed on the surfaces of primary particles or secondary particles of the lithium-containing composite metal compound after the final calcination step.

The coating material may be any of oxides, hydroxides, carbonates, nitrates, sulfates, halides, oxalates and alkoxides of aluminum, titanium, zirconium and tungsten, among which oxides are preferable.

For more efficiently coating the surface of the lithium-containing composite metal compound with the coating material, the coating material is preferably in the form of particles finer than the secondary particles of the lithium-containing composite metal compound. That is, the average secondary particle diameter of the coating material is preferably smaller than the secondary particle diameter of the lithium-containing composite metal compound. Specifically, the average secondary particle diameter of the coating material is preferably 1 μm or less, and more preferably 0.1 μm or less.

The coating material and the lithium-containing composite metal compound are mixed uniformly until there are no lumpy aggregates. The mixing apparatus is not limited as long as the coating material and the lithium-containing composite metal compound can be mixed uniformly, but it is preferable to use a Loedige mixer. The same applies to the case where the coating material is added and mixed in the mixing step of mixing the composite metal compound with the lithium salt.

Further, by performing the mixing in an atmosphere containing water or water and carbon dioxide, a coating layer can be more firmly attached to the surface of the lithium-containing composite metal compound.

The coating layer can be more firmly attached to the surface of the lithium-containing composite metal compound by holding the coating material and the lithium-containing composite metal compound in an atmosphere containing water or water and carbon dioxide after mixing.

With respect to the optional heat treatment to be carried out after mixing the coating material and the lithium-containing composite metal oxide, appropriate conditions therefor (temperature, retention time) may vary depending on the type of the coating material.

For example, when aluminum is used in the coating material, it is preferable to perform the calcination at a temperature in the range of 600° C. or more and 800° C. or less for 4 hours or more and 10 hours or less. By performing the calcination under these high temperature/long time calcination conditions, the positive electrode active material can be controlled to satisfy the above requirements (1) and (2). When the calcination temperature is higher than 800° C., the coating material may be dissolved in the lithium-containing composite metal compound, resulting in failure of the coating layer formation. When the calcination time is less than 4 hours, the coating material may not be sufficiently diffused, resulting in non-uniform formation of the coating layer.

Alternatively, the positive electrode active material for a lithium secondary battery can be produced by forming a coating layer on the surface of the lithium-containing composite metal compound by means of sputtering, CVD, vapor deposition, or the like.

Further, the positive electrode active material for a lithium secondary battery may also be obtained by calcining a mixture of the aforementioned composite metal compound, lithium salt and coating material.

The positive electrode active material for a lithium secondary battery provided with a coating layer on the surface of primary particles or secondary particles of the lithium-containing composite metal compound is appropriately crushed and classified, and then used as a positive electrode active material for lithium secondary batteries.

<Lithium Secondary Battery>

Next, explanations are made on a positive electrode using the positive electrode active material (for a lithium secondary battery) of the present invention as a positive electrode active material of a lithium secondary battery, and a lithium secondary battery including this positive electrode, while describing the structure of a lithium secondary battery.

In one example of the lithium secondary battery of the present embodiment, the lithium secondary battery includes a positive electrode, a negative electrode, a separator interposed between the positive electrode and the negative electrode, and an electrolytic solution disposed between the positive electrode and the negative electrode.

Figure 1B:
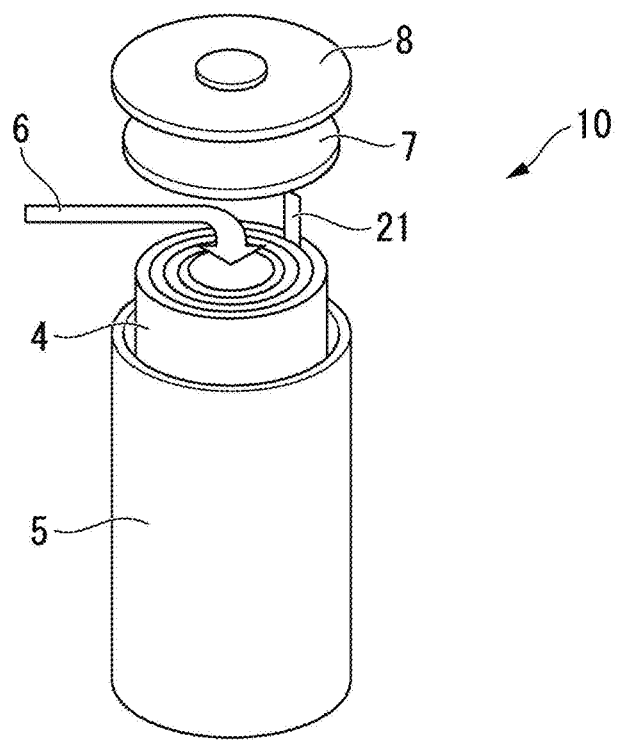
FIG. 1B is a schematic view showing one example of a lithium ion secondary battery.

Each of FIG. 1A and FIG. 1B is a schematic view illustrating an example of the lithium secondary battery of the present embodiment. A cylindrical lithium secondary battery 10 of the present embodiment is manufactured as described below.

First, as illustrated in FIG. 1A, a pair of separators 1 having a strip shape, a strip-shaped positive electrode 2 having a positive electrode lead 21 at one end, and a strip-shaped negative electrode 3 having a negative electrode lead 31 at one end are laminated in an order of the separator 1, the positive electrode 2, the separator 1, and the negative electrode 3, and are wound into an electrode group 4.

Next, as illustrated in FIG. 1B, the electrode group 4 and an insulator (not shown) are placed in a battery can 5, followed by sealing the bottom of the can, and then an electrolytic solution 6 is impregnated into the electrode group 4 such that an electrolyte is disposed between the positive electrode 2 and the negative electrode 3. Further, the top section of the battery can 5 is sealed using a top insulator 7 and a sealing body 8, whereby the lithium secondary battery 10 can be obtained.

The shape of the electrode group 4 may be, for example, of a columnar shape with its cross-section being round, oval, rectangular, or of a round-cornered rectangular shape, wherein the cross-section is perpendicular to the axis of winding of the electrode group 4.

As the shape of the lithium secondary battery including the aforementioned electrode group 4, it is possible to employ the shapes prescribed by IEC60086, which is the standard of batteries prescribed by the International Electrotechnical Commission (IEC), or JIS C 8500. Examples thereof include a cylindrical shape, an angular shape, etc.

The lithium secondary battery is not limited to the wound construction as described above, and may have a laminated construction obtained by laminating a positive electrode, a separator, a negative electrode, a separator, and so forth. Examples of the laminated lithium secondary battery include the so-called coin-type battery, button-type battery, and paper-type (or sheet-type) battery.

Hereinbelow, the respective components will be described.

(Positive Electrode)

The positive electrode of the present embodiment can be manufactured by, first, preparing a positive electrode mix including the aforementioned positive electrode active material, a conductive material and a binder, and causing the positive electrode mix to be supported on a positive electrode current collector.

(Conductive Material)

As the conductive material included in the positive electrode active material of the present embodiment, a carbonaceous material can be used. Examples of the carbonaceous material include a graphite powder, a carbon black (such as acetylene black) and a fibrous carbonaceous material. Since carbon black is a microparticle and has a large surface area, the addition of only a small amount of the carbon black to the positive electrode mix increases the conductivity within the positive electrode, and improves the charge/discharge efficiency and the output performance as well; however, too large an amount of carbon black deteriorates the binding strength of the binder exerted not only between the positive electrode mix and the positive electrode current collector but also within the positive electrode mix, thereby becoming an adverse factor that increases an internal resistance.

The amount of the conductive material in the positive electrode mix is preferably 5 parts by mass or more and 20 parts by mass or less, relative to 100 parts by mass of the positive electrode active material. This amount may be decreased when using a fibrous carbonaceous material such as a graphitized carbon fiber or a carbon nanotube as the conductive material.

(Binder)

As the binder included in the positive electrode active material of the present embodiment, a thermoplastic resin can be used. Examples of the thermoplastic resin include fluororesins such as polyvinylidene fluoride (hereinafter also referred to as PVdF), polytetrafluoroethylene (hereinafter also referred to as PTFE), ethylene tetrafluoride-propylene hexafluoride-vinylidene fluoride type copolymers, propylene hexafluoride-vinylidene fluoride type copolymers, and ethylene tetrafluoride-perfluorovinyl ether type copolymers; and polyolefin resins such as polyethylene and polypropylene.

Two or more of these thermoplastic resins may be used in the form of a mixture thereof. When a fluororesin and a polyolefin resin are used as the binder, it is possible to obtain a positive electrode mix capable of strong adhesive force relative to the positive electrode current collector as well as strong biding force within the positive electrode mix in itself by adjusting the ratio of the fluororesin to fall within the range of from 1% by mass to 10% by mass, and the ratio of the polyolefin resin to fall within the range of from 0.1% by mass to 2% by mass, based on the total mass of the positive electrode mix.

(Positive Electrode Current Collector)

As the positive electrode current collector included in the positive electrode of the present embodiment, it is possible to use a strip-shaped member composed of a metal material such as Al, Ni, or stainless steel as a component material. It is especially preferred to use a current collector which is made of Al and is shaped into a thin film because of its high processability and low cost.

Examples of the method for causing the positive electrode mix to be supported on the positive electrode current collector include a method in which the positive electrode mix is press-formed on the positive electrode current collector. Alternatively, the positive electrode mix may be caused to be supported on the positive electrode current collector by a method including producing a paste from the positive electrode mix using an organic solvent, applying the obtained paste of the positive electrode mix to at least one surface of the positive electrode current collector, drying the paste, and press-bonding the resultant to the current collector.

Examples of the organic solvent that can be used for producing the paste from the positive electrode mix include amine-based solvents such as N,N-dimethylaminopropylamine and diethylene triamine; ether-based solvents such as tetrahydrofuran; ketone-based solvents such as methyl ethyl ketone; ester-based solvents such as methyl acetate; and amide-based solvents such as dimethyl acetamide, and N-methyl-2-pyrrolidone (hereinafter, sometimes also referred to as "NMP").

Examples of the method for applying the paste of the positive electrode mix to the positive electrode current collector include a slit die coating method, a screen coating method, a curtain coating method, a knife coating method, a gravure coating method, and an electrostatic spray method.

The positive electrode can be produced by the method as described above.

(Negative Electrode)

The negative electrode included in the lithium secondary battery of the present embodiment is not particularly limited as long as it is capable of doping and de-doping lithium ions at a potential lower than the positive electrode, and examples thereof include an electrode comprising a negative electrode current collector having supported thereon a negative electrode mix including a negative electrode active material, and an electrode constituted solely of a negative electrode active material.

(Negative Electrode Active Material)

Examples of the negative electrode active material included in the negative electrode include materials which are carbonaceous materials, chalcogen compounds (oxides, sulfides, etc.), nitrides, metals or alloys, and allow lithium ions to be doped or de-doped at a potential lower than the positive electrode.

Examples of the carbonaceous materials that can be used as the negative electrode active material include graphite such as natural graphite and artificial graphite, cokes, carbon black, pyrolytic carbons, carbon fibers, and organic macromolecular compound-sintered bodies.

Examples of oxides that can be used as the negative electrode active material include oxides of silicon represented by the formula: $SiO_x$ (wherein x is an positive integer) such as $SiO_2$ and $SiO$; oxides of titanium represented by the formula: $TiO_x$ (wherein x is an positive integer) such as $TiO_2$ and $TiO$; oxides of vanadium represented by the formula: $VO_x$ (wherein x is an positive integer) such as $V_2O_5$ and $VO_2$; oxides of iron represented by the formula: $FeO_x$ (wherein x is an positive integer) such as $Fe_3O_4$, $Fe_2O_3$ and $FeO$; oxides of tin represented by the formula: $SnO_x$ (wherein x is an positive integer) such as $SnO_2$ and $SnO$; oxides of tungsten represented by the formula: $WO_x$ (wherein x is an positive integer) such as $WO_3$ and $WO_2$; and metal composite oxides containing lithium and titanium or vanadium such as $Li_4Ti_5O_{12}$ and $LiVO_2$.

Examples of sulfides that can be used as the negative electrode active material include sulfides of titanium represented by the formula: $TiS_x$ (wherein x is an positive integer) such as $Ti_2S_3$, $TiS_2$ and $TiS$; sulfides of vanadium represented by the formula: $VS_x$ (wherein x is an positive integer) such as $V_3S_4$, $VS_2$, and $VS$; sulfides of iron represented by the formula: $FeS_x$ (wherein x is an positive integer) such as $Fe_3S_4$, $FeS_2$ and $FeS$; sulfides of molybdenum represented by the formula: $MoS_x$ (wherein x is an positive integer) such as $Mo_2S_3$ and $MoS_2$; sulfides of tin represented by the formula: $SnS_x$ (wherein x is an positive integer) such as $SnS_2$ and $SnS$; sulfides of tungsten represented by the formula: $WS_x$ (wherein x is an positive integer) such as $WS_2$; sulfides of antimony represented by the formula: $SbS_x$ (wherein x is an positive integer) such as $Sb_2S_3$; and sulfides of selenium represented by the formula: $SeS_x$ (wherein x is an positive integer) such as $Se_5S_3$, $SeS_2$ and $SeS$.

Examples of nitrides that can be used as the negative electrode active material include lithium-containing nitrides such as $Li_3N$ and $Li_{3-x}A_xN$ (wherein A is one or both of Ni and Co, and $0<x<3$).

Each of the aforementioned carbonaceous materials, oxides, sulfides and nitrides may be used alone or in combination. Further, each of the aforementioned carbonaceous materials, oxides, sulfides and nitrides may be crystalline or amorphous.

Examples of metals that can be used as the negative electrode active material include lithium metals, silicon metals, tin metals, etc.

Examples of alloys that can be used as the negative electrode active material include lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$.

The metals or alloys are processed into, for example, a foil, and are in many cases used alone as an electrode.

Among the aforementioned negative electrode active materials, carbonaceous materials composed mainly of graphite such as natural graphite or artificial graphite are preferably used for reasons such as follows: the potential of the negative electrode hardly changes during charging from an uncharged state to a fully charged state (the potential flatness is favorable), the average discharge potential is low, the capacity retention after repeated charge/discharge cycles is high (the cycle performance is favorable), etc. Examples of the shape of the carbonaceous material include a flake shape as in the case of natural graphite, a spherical shape as in the case of mesocarbon microbeads, a fibrous shape as in the case of a graphitized carbon fiber, an agglomerate of fine powder, etc., and the carbonaceous material may have any of these shapes.

The negative electrode mix may include a binder as necessary. As the binder, a thermoplastic resin can be used, and examples thereof include PVdF, thermoplastic polyimides, carboxymethyl cellulose, polyethylene, and polypropylene.

(Negative Electrode Current Collector)

Examples of the negative electrode current collector included in the negative electrode include a strip-shaped member composed of a metal material such as Cu, Ni or stainless steel as a component material. Among these, it is preferred to use a current collector which is made of Cu and is shaped into a thin film, since Cu is unlikely to form an alloy with lithium and can be easily processed.

Examples of the method for causing the negative electrode mix to be supported on the above-described negative electrode current collector include, as in the case of the positive electrode, a press forming method, and a method in which a paste of the negative electrode mix obtained by using a solvent etc., is applied to and dried on the negative electrode current collector, and the resulting is press-bonded to the current collector.

(Separator)

As the separator used in the lithium secondary battery of the present embodiment, for example, it is possible to use one that is formed of a material such as a polyolefin resin (e.g., polyethylene or polypropylene), a fluororesin or a nitrogen-containing aromatic polymer, and has a form of a porous film, a nonwoven fabric, a woven fabric or the like. The separator may be composed of two or more of the materials mentioned above, or may be formed by laminating these materials.

In the present embodiment, for satisfactory permeation of the electrolyte through the separator during the use (charge and discharge) of the battery, the separator preferably has an air resistance of 50 sec/100 cc to 300 sec/100 cc, more preferably 50 sec/100 cc to 200 sec/100 cc as measured by Gurley method prescribed in JIS P 8117.

The porosity of the separator is preferably 30% by volume to 80 by volume, and more preferably 40% by volume to 70% by volume. The separator may be a laminate of separators having different porosities.

(Electrolytic Solution)

The electrolytic solution used in the lithium secondary battery of the present embodiment contains an electrolyte and an organic solvent.

Examples of the electrolyte contained in the electrolytic solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (wherein "BOB" means bis(oxalato)borate), LiFSI (wherein "FSI" means bis(fluorosulfonyl)imide), a lithium salt of a lower aliphatic carboxylic acid, and $LiAlCl_4$. Two or more of these salts may be used in the form of a mixture thereof. Among these electrolytes, it is preferred to use at least one fluorine-containing salt selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$.

As the organic solvent included in the electrolytic solution, it is possible to use, for example, a carbonate such as propylene carbonate, ethylene carbonate, dimethyl carbonate, diethyl carbonate, ethyl methyl carbonate, 4-trifluoromethyl-1,3-dioxolane-2-one, and 1,2-di(methoxycarbonyloxy)ethane; an ether such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyl tetrahydrofuran; an ester such as methyl formate, methyl acetate, and y-butyrolactone; a nitrile such as acetonitrile and butyronitrile; an amide such as N,N-dimethyl formamide and N,N-dimethylacetoamide; a carbamate such as 3-methyl-2-oxazolidone; a sulfur-containing compound such as sulfolane, dimethyl sulfoxide, and 1,3-propane sultone; or a solvent produced by further introducing a fluoro group into the above-described organic solvent (a solvent in which one or more hydrogen atoms included in the organic solvent is substituted by a fluorine atom).

As the organic solvent, it is preferable to use a mixture of two or more of these organic solvents. Among the aforementioned organic solvents, a solvent mixture including a carbonate is preferable, and a solvent mixture of a cyclic carbonate and a non-cyclic carbonate and a solvent mixture of a cyclic carbonate and ether are more preferable. As the solvent mixture of a cyclic carbonate and a non-cyclic carbonate, a solvent mixture including ethylene carbonate, dimethyl carbonate, and ethyl methyl carbonate is preferable. An electrolytic solution using the aforementioned solvent mixture has many advantages such as a wider operational temperature range, a low tendency of deterioration even after charge/discharge at a high current rate, a low tendency of deterioration even when used for a long period of time, and a low decomposability even when a graphite material such as natural graphite or artificial graphite is used as the active material for the negative electrode.

For improving the stability of the obtained lithium secondary battery, it is preferable to use an electrolytic solution including a lithium salt containing fluorine such as $LiPF_6$ and an organic solvent having a fluorine substituent. A solvent mixture including ether having a fluorine substituent such as pentafluoropropyl methyl ether or 2,2,3,3-tetrafluoropropyl difluoromethyl ether and dimethyl carbonate is more preferable since a high capacity retention is achievable even when the battery is charged and discharged at a high current rate.

A solid electrolyte may be used instead of the aforementioned electrolytic solution. As the solid electrolyte, it is possible to use, for example, an organic polymer electrolyte such as a polyethylene oxide-type polymeric compound or a polymeric compound including at least one type of polymer chain selected from a polyorganosiloxane chain or a polyoxyalkylene chain. It is also possible to use the so-called gel-type electrolyte including a polymer retaining therein a non-aqueous electrolytic solution. Further, it is also possible to use an inorganic solid electrolyte including a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$. In some cases, the use of such a solid electrolyte may further improve the safety of the lithium secondary battery.

In the lithium secondary battery of the present embodiment, the solid electrolyte, when used, may serve as a separator. In such a case, the separator may be omitted.

The positive electrode active material according to the present embodiment satisfies all of the requirements (1) to (2) described above. This means that the positive electrode active material has a configuration wherein the coating layer is uniformly formed on the surface of the lithium-containing metal composite compound. With such a configuration, there are no or very few places where the lithium-containing metal composite compound directly contacts the electrolytic solution, so that generation of gas due to contact with the electrolytic solution can be suppressed. For this reason, a lithium secondary battery manufactured using the positive electrode active material according to the present embodiment can suppress battery swelling.

EXAMPLES

Hereinbelow, the present invention will be described in more detail with reference to the Examples.

<Composition Analysis>

The composition analysis of the lithium-containing metal composite compound manufactured by the method described below was carried out using an inductively coupled plasma emission spectrometer (SPS3000, manufactured by SII Nano Technology Inc.) after the lithium-containing metal composite compound was dissolved in hydrochloric acid.

<Measurement of Water Content>

The water content was measured using a coulometric Karl Fischer moisture meter (831 Coulometer, manufactured by Metrohm).

<Measurement of BET Specific Surface Area>

The BET specific surface area was measured using Macsorb (registered trademark) manufactured by Mountech Co., Ltd. after 1 g of the positive electrode active material for a lithium secondary battery was dried at 105° C. in a nitrogen atmosphere for 30 minutes.

<Measurements of lithium carbonate content and lithium hydroxide content>

20 g of the positive electrode active material for a lithium secondary battery and 100 g of pure water were placed in a 100 ml beaker and stifled for 5 minutes. After stirring, the positive electrode active material for a lithium secondary battery was filtered, 0.1 mol/L hydrochloric acid was added dropwise to 60 g of the remaining filtrate, and the pH of the filtrate was measured with a pH meter. By the equation described below, the residual lithium carbonate content and the residual lithium hydroxide content of the positive electrode active material for a lithium secondary battery were calculated with the titration amount of hydrochloric acid at pH=8.3±0.1 as A ml and the titration amount of hydrochloric acid at pH=4.5±0.1 as B ml. In the equation below, the molecular weights of lithium carbonate and lithium hydroxide were calculated supposing the following atomic weights for the respective atoms: H=1.000, Li=6.941, C=12, O=16.

$$\text{Lithium carbonate content (\%)}=0.1\times(B-A)/1000\times 73.882/(20\times 60/100)\times 100$$

$$\text{Lithium hydroxide content (\%)}=0.1\times(2A-B)/1000\times 23.941/(20\times 60/100)\times 100$$

<Measurement by Scanning Electron Microscopy-Energy Dispersive X-Ray Spectroscopy (SEM-EDX)>

Aluminum

The surfaces of the particles of the positive electrode active material for a lithium secondary battery were analyzed by scanning electron microscopy-energy dispersive X-ray spectroscopy (SEM-EDX: product name S-4800, manufactured by Hitachi High-Technologies Corporation, which was mounted with an energy dispersive X-ray analyzer, X-Max$^N$, manufactured by Oxford Instruments) to obtain a ratio, AR, of a detection intensity of aluminum to a detection intensity of nickel (detection intensity of aluminum/detection intensity of nickel).

The value of AR obtained when the SEM-EDX was performed at an acceleration voltage of 3 kV was defined as $AR_3$.

The value of AR obtained when the SEM-EDX was performed at an acceleration voltage of 10 kV was defined as $AR_{10}$.

With respect to the obtained values of $AR_3$ and $AR_{10}$, a ratio $[AR_3/AR_{10}]$, an average value $[Ave(AR_3/AR_{10})]$, and a standard deviation $[\sigma(AR_3/AR_{10})]$ were calculated.

From the average and the standard deviation, a coefficient of variation $[\sigma(AR_3/AR_{10})]/[Ave(AR_3/AR_{10})]$ was calculated.

Tungsten

The surfaces of the particles of the positive electrode active material for a lithium secondary battery were analyzed by scanning electron microscopy-energy dispersive X-ray spectroscopy (SEM-EDX: product name S-4800, manufactured by Hitachi High-Technologies Corporation, which was mounted with an energy dispersive X-ray analyzer, X-Max$^N$, manufactured by Oxford Instruments) to obtain a ratio, WR, of a detection intensity of tungsten to a detection intensity of nickel (detection intensity of tungsten/detection intensity of nickel).

The value of WR obtained when the SEM-EDX was performed at an acceleration voltage of 3 kV was defined as $WR_3$.

The value of WR obtained when the SEM-EDX was performed at an acceleration voltage of 10 kV was defined as $WR_{10}$.

With respect to the obtained values of $WR_3$ and $WR_{10}$, a ratio $[WR_3/WR_{10}]$, an average value $[Ave(WR_3/WR_{10})]$, and a standard deviation $[\sigma(WR_3/WR_{10})]$ were calculated.

From the average and the standard deviation, a coefficient of variation $[\sigma(WR_3/WR_{10})]/[Ave(WR_3/WR_{10})]$ was calculated.

Zirconium

The surfaces of the particles of the positive electrode active material for a lithium secondary battery were analyzed by scanning electron microscopy-energy dispersive X-ray spectroscopy (SEM-EDX: product name S-4800, manufactured by Hitachi High-Technologies Corporation, which was mounted with an energy dispersive X-ray analyzer, X-Max$^N$, manufactured by Oxford Instruments) to obtain a ratio, ZR, of a detection intensity of zirconium to a detection intensity of nickel (detection intensity of zirconium/detection intensity of nickel).

The value of ZR obtained when the SEM-EDX was performed at an acceleration voltage of 5 kV was defined as $ZR_5$.

The value of ZR obtained when the SEM-EDX was performed at an acceleration voltage of 10 kV was defined as $ZR_{10}$.

With respect to the obtained values of $ZR_5$ and $ZR_{10}$, a ratio $[ZR_5/ZR_{10}]$, an average value $[Ave(ZR_5/ZR_{10})]$, and a standard deviation $[\sigma(ZR_5/ZR_{10})]$ were calculated.

From the ratio average and the standard deviation, a coefficient of variation $[\sigma(ZR_5/ZR10)]/[Ave(ZR_5/ZR10)]$ was calculated.

<Production of Positive Electrode for Lithium Secondary Battery>

A positive electrode active material obtained by the production method described below, a conductive material (acetylene black), and a binder (PVdF) were mixed and kneaded so as to obtain a composition wherein positive electrode active material:conductivematerial:binder=92:5:3 (mass ratio), thereby preparing a paste-like positive electrode mix. In preparation of the positive electrode mix, N-methyl-2-pyrrolidone was used as an organic solvent.

The obtained positive electrode mix was applied to a 40 μm-thick Al foil which served as a current collector, and was dried in vacuo at 150° C. for 8 hours, thereby obtaining a positive electrode for a lithium secondary battery. The electrode area of the positive electrode for a lithium secondary battery was set to 1.65 cm$^2$.

<Production of Negative Electrode for Lithium Secondary Battery>

Next, artificial graphite (MAGD, manufactured by Hitachi Chemical Co., Ltd.) as a negative electrode active material, CMC (manufactured by Daiichi Kogyo Co., Ltd.) and SBR (manufactured by Nippon A & L Inc.) as binders were mixed such that negative electrode active material:CMC:SBR=98:1:1 (mass ratio), and the resulting was kneaded to prepare a paste-like negative electrode mix. In preparation of the negative electrode mix, an ion exchanged water was used as a solvent.

The obtained negative electrode mix was applied to a 12 μm-thick Cu foil which served as a current collector, and was dried in vacuo at 60° C. for 8 hours, thereby obtaining a negative electrode for a lithium secondary battery. The electrode area of the negative electrode for a lithium secondary battery was set to 1.77 cm$^2$.

<Production of Lithium Secondary Battery (Coin-Type Full Cell)>

The following operations were carried out in an argon atmosphere within a glove box.

The positive electrode produced in the "Production of Positive Electrode for Lithium Secondary Battery" was placed on a bottom lid of a coin cell for a coin-type battery R2032 (manufactured by Hohsen Corporation) with the aluminum foil surface facing downward, and a laminate film separator (a separator including a heat-resistant porous layer laminated on a polyethylene porous film (thickness: 16 μm)) was placed on the positive electrode. 300 μl of an electrolytic solution was injected thereinto. The electrolytic solution used was prepared by adding 1% by volume of vinylene carbonate (hereinafter, sometimes referred to as VC) to a liquid mixture of ethylene carbonate (hereinafter, sometimes also referred to as "EC"), dimethyl carbonate (hereinafter, sometimes also referred to as "DMC"), and ethyl methyl carbonate (hereinafter, sometimes also referred to as "EMC") at a volume ratio of 16:10:74, followed by dissolving 1.3 mol/l of $LiPF_6$ in the mixture. Hereinafter, the electrolytic solution may also be referred to as "$LiPF_6$/EC+DMC+EMC".

Next, the negative electrode produced in the above <Production of Negative Electrode for Lithium Secondary Battery> was placed on the laminate film separator, covered with a top lid through a gasket, and swaged using a swage, thereby producing a lithium secondary battery (coin-type full cell R2032). Hereinafter, this battery may also be referred to as "full cell".

<Discharge Test>

An initial charge/discharge test was carried out under conditions described below using the full cell produced in the above <Production of Lithium Secondary Battery (Coin-type Full Cell)>.

<Charge/Discharge Conditions>

Test temperature: 25° C.

Constant current/constant voltage charging: maximum charge voltage of 4.2 V, charge time of 6 hours, and charge current of 0.2 CA.

Constant Current Discharging: minimum discharge voltage of 2.7 V, discharge time of 5 hours, and discharge current of 0.2 CA.

<Measurement of Direct Current Resistance>

Assuming that the discharge capacity measured above corresponds to 100% charge depth (hereinafter also referred to as SOC), battery resistance at 100% SOC was measured at 25° C. The adjustment to each SOC was carried out in an environment of 25° C. For the measurement of battery resistance, a full cell with its SOC adjusted was allowed to stand in a thermostatic chamber at 25° C. for 2 hours, and subjected to the following procedures in this sequence: discharge at 20 μA for 15 seconds, standing for 5 minutes, charge at 20 μA for 15 seconds, standing for 5 minutes, discharge at 40 μA for 15 seconds, standing for 5 minutes, charge at 20 μA for 30 seconds, standing for 5 minutes, discharge at 80 μA for 15 seconds, stand for 5 minutes, charge at 20 μA for 60 seconds, standing for 5 minutes, discharge at 160 μA for 15 seconds, standing for 5 minutes, charge at 20 μA for 120 seconds, and standing for 5 minutes. From the plots of battery voltage values versus current values measured 10 seconds after discharge at 20, 40, 80, and 120 μA, an approximate curve was obtained by calculation using the least square approximation method, and the slope of this approximate curve was taken as the battery resistance.

<Manufacture of Lithium Secondary Battery (Laminate Cell)>

The positive electrode produced in the <Production of Positive Electrode for Lithium Secondary Battery> was placed on an aluminum laminate film with the aluminum foil surface facing downward, and a laminated film separator (polyethylene porous film (thickness 27 μm)) was formed thereon. Next, the negative electrode produced in the <Production of Negative Electrode for Lithium Secondary Battery> was placed on the upper side of the laminated film separator with the copper foil surface facing upward, and an aluminum laminate film is placed thereon. Further, the resulting was heat-sealed while leaving an injection inlet for the electrolytic solution, and was moved to a dry bench having a dry atmosphere with a dew point temperature of −50° C. or less, followed by injection of 1 mL of the electrolyte solution using a vacuum injection machine. The electrolytic solution used was prepared by adding 1% by volume of vinylene carbonate (hereinafter, sometimes referred to as VC) to a liquid mixture of ethylene carbonate (hereinafter, sometimes also referred to as "EC"), dimethyl carbonate (hereinafter, sometimes also referred to as "DMC"), and ethyl methyl carbonate (hereinafter, sometimes also referred to as "EMC") at a volume ratio of 16:10:74, followed by dissolving 1.3 mol/l of $LiPF_6$ in the mixture.

Finally, the injection inlet for the electrolyte solution was heat-sealed to produce a laminate cell.

<Measurement of Battery Swelling Volume>

The laminate cell produced as described above was subjected to an X-ray CT scan, and the laminate cell volume before the test was calculated. Then, charge/discharge was performed on the following test conditions, and the laminate cell volume was measured again to calculate the volume difference between before and after the test. The volume difference ($cm^3$) between before and after the test was divided by the amount (g) of the positive electrode active material present in the laminate cell to thereby determine a volume of battery swelling per unit weight of the positive electrode active material ($cm^3/g$).

<Test Conditions>

Number of discharge/charge cycles: 50 times

Test temperature: 60° C.

Constant current/constant voltage charging: maximum charge voltage of 4.2 V, charge time of 2.5 hours, and charge current of 0.5 CA.

Constant Current Discharging: minimum discharge voltage of 2.7 V, discharge time of 1 hour, and discharge current of 1 CA.

Example 1

Production of Positive Electrode Active Material 1 for Lithium Secondary Battery

[Step of Producing Nickel-Cobalt-Manganese Composite Hydroxide]

Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.510:0.225:0.265, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 11.2 as measured at 40° C. Then, a nitrogen gas-air mixture as an oxidizing gas was allowed to flow through the reaction vessel, and respective liquid amounts were adjusted such that the reaction time became 11 hours, thereby obtaining a nickel-cobalt-manganese composite hydroxide particles. The obtained particles were washed with an aqueous solution of sodium hydroxide, dehydrated and separated by a centrifugal separator, and dried at 105° C. to obtain a nickel-cobalt-manganese composite hydroxide 1.

[Mixing Step]

The thus obtained nickel-cobalt-manganese composite hydroxide 1 and a lithium carbonate powder were weighed such that Li/(Ni+Co+Mn)=1.07, followed by mixing.

[Calcination Step]

The mixture obtained in the mixing step described above was calcinated in an oxygen atmosphere at 930° C. for 5 hours, thereby obtaining a calcinated product 1.

The composition analysis of the obtained calcinated product 1 was performed and the results were applied to the composition formula (A). As a result, it was found that x=0.032, a=0.512, b=0.223, c=0.265, and d=0.000.

[Coating Step]

The calcinated product 1 and aluminum oxide were weighed such that Al/(Ni+Co+Mn)=0.01, and were mixed in an atmosphere containing water and carbon dioxide gas using a Loedige mixer. The resulting was calcinated in ambient atmosphere at 760° C. for 5 hours, thereby obtaining a positive electrode active material 1 for a lithium secondary battery.

Figure 2:
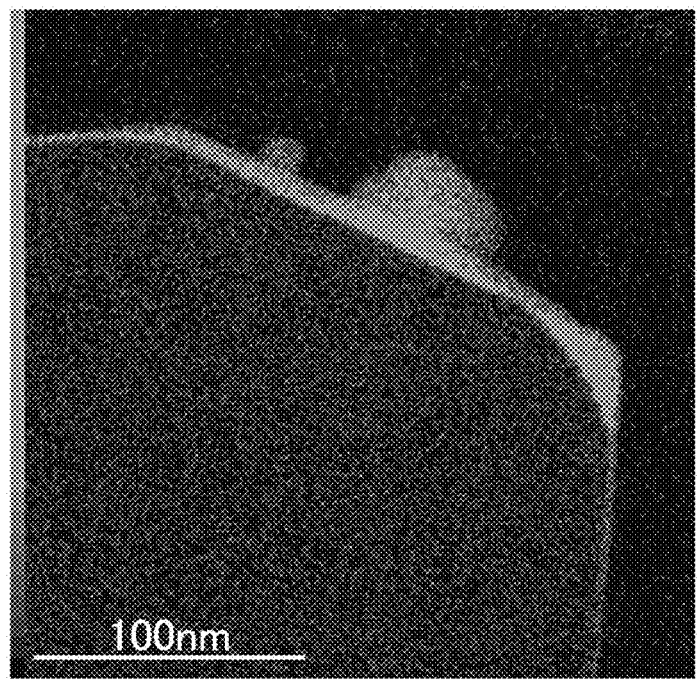
FIG. 2 is an image diagram obtained by aluminum element mapping by STEM-EDX with respect to a cross section of a positive electrode active material for a lithium secondary battery of Example 1.

Evaluation of Positive Electrode Active Material 1 for Lithium Secondary Battery The particle cross sections of the obtained positive electrode active material 1 for a lithium secondary battery were subjected to aluminum element mapping by STEM-EDX, and it was confirmed that the coating layer containing an aluminum element was uniformly formed on the particle surfaces. The results are shown in FIG. 2.

Example 2

Production of Positive Electrode Active Material 2 for Lithium Secondary Battery

[Mixing Step]

The nickel-cobalt-manganese composite hydroxide 1 and a lithium carbonate powder were weighed such that Li/(Ni+Co+Mn)=1.07, followed by mixing.

[Calcination Step]

The mixture obtained in the mixing step described above was calcinated in an oxygen atmosphere at 910° C. for 5 hours, thereby obtaining a calcinated product 2.

The composition analysis of the obtained calcinated product 2 was performed and the results were applied to the composition formula (A). As a result, it was found that x=0.024, a=0.511, b=0.224, c=0.265, and d=0.000.

[Coating Step]

The calcinated product 2 and aluminum oxide were weighed such that Al/(Ni+Co+Mn)=0.01, and were mixed in an atmosphere containing water and carbon dioxide gas using a Loedige mixer. The resulting was calcinated in ambient atmosphere at 760° C. for 5 hours, thereby obtaining a positive electrode active material 2 for a lithium secondary battery.

Example 3

Production of Positive Electrode Active Material 3 for Lithium Secondary Battery

[Step of Producing Nickel-Cobalt-Manganese Composite Hydroxide]

Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.510:0.225:0.265, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 12.4 as measured at 40° C. Then, a nitrogen gas-air mixture as an oxidizing gas was allowed to flow through the reaction vessel, and respective liquid amounts were adjusted such that the reaction time became 20 hours, thereby obtaining a nickel-cobalt-manganese composite hydroxide particles. The obtained particles were washed with an aqueous solution of sodium hydroxide, dehydrated by a centrifugal separator, separated and dried at 105° C. to obtain a nickel-cobalt-manganese composite hydroxide 3.

[Mixing Step]

The thus obtained nickel-cobalt-manganese composite hydroxide 3 and a lithium carbonate powder were weighed such that Li/(Ni+Co+Mn)=1.07, followed by mixing.

[Calcination Step]

The mixture obtained in the mixing step described above was calcinated in an ambient atmosphere at 870° C. for 10 hours, thereby obtaining a calcinated product 3.

The composition analysis of the obtained calcinated product 3 was performed and the results were applied to the composition formula (A). As a result, it was found that x=0.030, a=0.516, b=0.222, c=0.262, and d=0.000.

[Coating Step]

The calcinated product 3 and aluminum oxide were weighed such that Al/(Ni+Co+Mn)=0.01, and were dry-mixed using a VG mixer. The resulting was calcinated in ambient atmosphere at 760° C. for 5 hours, thereby obtaining a positive electrode active material 3 for a lithium secondary battery.

Figure 3:
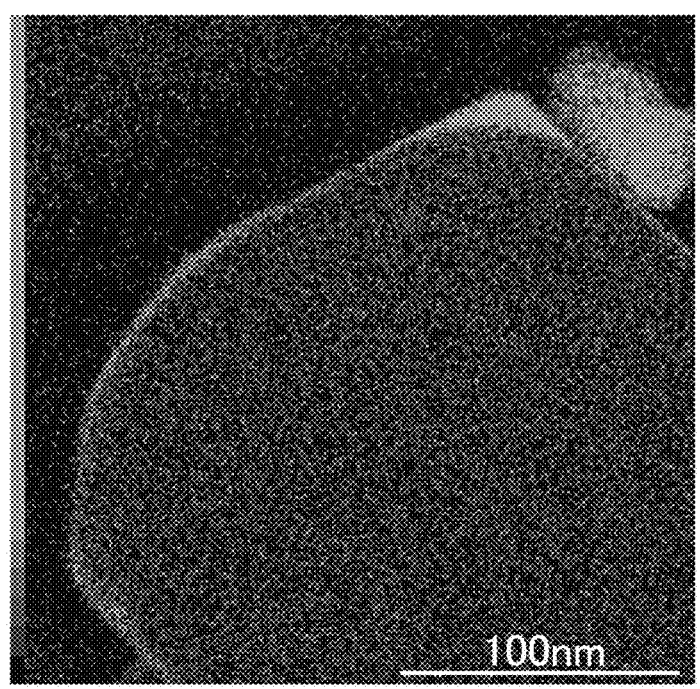
FIG. 3 is an image diagram obtained by aluminum element mapping by STEM-EDX with respect to a cross section of a positive electrode active material for a lithium secondary battery of Example 3.

Evaluation of Positive Electrode Active Material 3 for Lithium Secondary Battery The particle cross sections of the obtained positive electrode active material 3 for a lithium secondary battery were subjected to aluminum element mapping by STEM-EDX, and it was confirmed that the coating layer containing an aluminum element was uniformly formed on the particle surfaces. The results are shown in FIG. 3.

Example 4

Production of Positive Electrode Active Material 4 for Lithium Secondary Battery

[Step of Producing Nickel-Cobalt-Manganese Composite Hydroxide]

Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.550:0.210:0.240, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 11.8 as measured at 40° C. Then, a nitrogen gas-air mixture as an oxidizing gas was allowed to flow through the reaction vessel, and respective liquid amounts were adjusted such that the reaction time became 17 hours, thereby obtaining a nickel-cobalt-manganese composite hydroxide particles. The obtained particles were washed with an aqueous solution of sodium hydroxide, dehydrated and separated by a centrifugal separator, and dried at 105° C. to obtain a nickel-cobalt-manganese composite hydroxide 4.

[Mixing Step]

The thus obtained nickel-cobalt-manganese composite hydroxide 4 and a lithium carbonate powder were weighed such that Li/(Ni+Co+Mn)=1.07, followed by mixing.

[Calcination Step]

The mixture obtained in the mixing step described above was calcinated in an oxygen atmosphere at 910° C. for 5 hours, thereby obtaining a calcinated product 4.

The composition analysis of the obtained calcinated product 4 was performed and the results were applied to the composition formula (A). As a result, it was found that x=0.034, a=0.553, b=0.207, c=0.240, and d=0.000.

[Coating Step]

The calcinated product 4 and aluminum oxide were weighed such that Al/(Ni+Co+Mn)=0.01, and were mixed in an atmosphere containing water and carbon dioxide gas using a Loedige mixer. The resulting was calcinated in ambient atmosphere at 760° C. for 5 hours, thereby obtaining a positive electrode active material 4 for a lithium secondary battery.

Example 5

Production of Positive Electrode Active Material 5 for Lithium Secondary Battery

[Step of Producing Nickel-Cobalt-Aluminum Composite Hydroxide]

Into a reaction vessel equipped with a stirrer and an overflow pipe was charged water, followed by addition of an aqueous sodium hydroxide solution. The temperature of the resulting liquid was maintained at 40 to 45° C.

An aqueous nickel sulfate solution, an aqueous cobalt sulfate solution and an aqueous aluminum sulfate solution were mixed together such that the atomic ratio between nickel atoms, cobalt atoms and aluminum atoms became 0.880:0.090:0.030, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel fell within the range of 12.1 to 12.5 as measured at 40° C. Then, a nitrogen gas-air mixture as an oxidizing gas was allowed to flow through the reaction vessel, and respective liquid amounts were adjusted such that the reaction time became 13 hours, thereby obtaining a nickel-cobalt-aluminum composite hydroxide particles. The obtained particles were washed with an aqueous solution of sodium hydroxide, dehydrated and separated by a centrifugal separator, and dried at 105° C. to obtain a nickel-cobalt-aluminum composite hydroxide 5.

[Mixing Step]

The thus obtained nickel-cobalt-aluminum composite hydroxide 5 and a lithium hydroxide powder were weighed such that Li/(Ni+Co+Al)=1.06, followed by mixing.

[Calcination Step]

The mixture obtained in the mixing step described above was calcinated in an oxygen atmosphere at 720° C. for 6 hours, thereby obtaining a calcinated product 5.

The composition analysis of the obtained calcinated product 5 was performed and the results were applied to the composition formula (A). As a result, it was found that x=0.005, a=0.883, b=0.088, c=0.000, and d=0.029.

[Coating Step]

The calcinated product 5 and aluminum oxide were weighed such that Al[1]/(Ni+Co+Al[2])=0.015, and were dry-mixed using a Loedige mixer. The resulting was calcinated in an oxygen atmosphere at 720° C. for 5 hours, thereby obtaining an aluminum-coated lithium metal composite oxide powder 5. Here, Al[1] represents aluminum derived from the aluminum oxide as the coating material, and Al[2] represents aluminum derived from the calcinated product 5.

[Rinsing Step]

Thereafter, the obtained aluminum-coated lithium metal composite oxide powder 5 was rinsed with water. The rinsing step was performed by stirring a slurry-like liquid obtained by adding the aluminum-coated lithium metal composite oxide powder 5 to pure water for 20 minutes, followed by dehydration.

[Drying Step]

Thereafter, the resulting wet cake obtained in the dehydration step was vacuum-dried at 80° C. for 15 hours and at 150° C. for 8 hours to obtain a positive electrode active material 5 for a lithium secondary battery.

Example 6

Production of Positive Electrode Active Material 6 for Lithium Secondary Battery

[Step of Producing Nickel-Cobalt Composite Hydroxide]

Into a reaction vessel equipped with a stirrer and an overflow pipe was charged water, followed by addition of an aqueous sodium hydroxide solution. The temperature of the resulting liquid was maintained at 50 to 55° C.

An aqueous nickel sulfate solution and an aqueous cobalt sulfate solution were mixed together such that the atomic ratio of nickel atoms to cobalt atoms became 0.890:0.110, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel fell within the range of 11.8 to 12.5 as measured at 40° C. Then, a nitrogen gas-air mixture as an oxidizing gas was allowed to flow through the reaction vessel, and respective liquid amounts were adjusted such that the reaction time became 19 hours, thereby obtaining a nickel-cobalt composite hydroxide particles. The obtained particles were washed with an aqueous solution of sodium hydroxide, dehydrated and separated by a centrifugal separator, and dried at 105° C. to obtain a nickel-cobalt composite hydroxide 6.

[Mixing Step]

The thus obtained nickel-cobalt composite hydroxide 6 and a lithium hydroxide powder were weighed such that Li/(Ni+Co)=1.04, followed by mixing.

[Calcination Step]

The mixture obtained in the mixing step described above was calcinated in an oxygen atmosphere at 720° C. for 6 hours, thereby obtaining a calcinated product 6. The composition analysis of the obtained calcinated product 6 was performed and the results were applied to the composition formula (A). As a result, it was found that x=0.021, a=0.890, b=0.110, c=0.000, and d=0.000.

[Coating Step]

The calcinated product 6 and aluminum oxide were weighed such that Al/(Ni+Co)=0.015, and were dry-mixed using a Loedige mixer. The resulting was calcinated in an oxygen atmosphere at 720° C. for 5 hours, thereby obtaining an aluminum-coated lithium metal composite oxide powder 6.

[Rinsing Step]

Thereafter, the obtained aluminum-coated lithium metal composite oxide powder 6 was rinsed with water. The rinsing step was performed by stirring a slurry-like liquid obtained by adding the aluminum-coated lithium metal composite oxide powder 6 to pure water for 20 minutes, followed by dehydration.

[Drying Step]

Thereafter, the resulting wet cake obtained in the dehydration step was vacuum-dried at 80° C. for 15 hours and at 150° C. for 8 hours to obtain a positive electrode active material 6 for a lithium secondary battery.

Example 7

Production of Positive Electrode Active Material 7 for Lithium Secondary Battery

[Step of Producing Nickel-Cobalt-Manganese Composite Hydroxide]

Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.550:0.210:0.240, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 11.7 as measured at 40° C. Then, a nitrogen gas-air mixture as an oxidizing gas was allowed to flow through the reaction vessel, and respective liquid amounts were adjusted such that the reaction time became 12 hours, thereby obtaining a nickel-cobalt-manganese composite hydroxide particles. The obtained particles were washed with an aqueous solution of sodium hydroxide, dehydrated and separated by a centrifugal separator, and dried at 105° C. to obtain a nickel-cobalt-manganese composite hydroxide 7.

[Mixing Step]

The thus obtained nickel-cobalt-manganese composite hydroxide 7 and a lithium carbonate powder were weighed such that Li/(Ni+Co+Mn)=1.07, followed by mixing.

[Calcination Step]

The mixture obtained in the mixing step described above was calcinated in an oxygen atmosphere at 940° C. for 5 hours, thereby obtaining a calcinated product 7.

The composition analysis of the obtained calcinated product 7 was performed and the results were applied to the composition formula (A). As a result, it was found that x=0.041, a=0.549, b=0.209, c=0.242, and d=0.000.

[Tungsten Coating Step]

The calcinated product 7 obtained as described above was heated to 105° C., to which was sprayed an alkali solution composed of tungsten oxide dissolved in an aqueous lithium hydroxide solution over 1 hour, while mixing with a Loedige mixer. In this process, the tungsten concentration in the alkaline solution was adjusted such that W/(Ni+Co+Mn)=0.005 (molar ratio). As a result of this step, a tungsten-coated lithium metal composite oxide powder 7 was obtained.

[Aluminum Coating Step]

The calcinated product 7 and aluminum oxide were weighed such that Al/(Ni+Co+Mn)=0.01, and were mixed in an atmosphere containing water and carbon dioxide gas using a Loedige mixer. The resulting was calcinated in ambient atmosphere at 760° C. for 5 hours, thereby obtaining a positive electrode active material 7 for a lithium secondary battery.

Example 8

Production of Positive Electrode Active Material 8 for Lithium Secondary Battery

[Step of Producing Nickel-Cobalt-Manganese Composite Hydroxide]

Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.550:0.210:0.240, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 12.0 as measured at 40° C. Then, a nitrogen gas-air mixture as an oxidizing gas was allowed to flow through the reaction vessel, and respective liquid amounts were adjusted such that the reaction time became 20 hours, thereby obtaining a nickel-cobalt-manganese composite hydroxide particles. The obtained particles were washed with an aqueous solution of sodium hydroxide, dehydrated and separated by a centrifugal separator, and dried at 105° C. to obtain a nickel-cobalt-manganese composite hydroxide 8.

[Mixing Step]

The thus obtained nickel-cobalt-manganese composite hydroxide 8 and a lithium carbonate powder were weighed such that Li/(Ni+Co+Mn)=1.07, followed by mixing.

[Calcination Step]

The mixture obtained in the mixing step described above was calcined in an ambient atmosphere at 850° C. for 10 hours, thereby obtaining a calcinated product 8.

The composition analysis of the obtained calcinated product 8 was performed and the results were applied to the composition formula (A). As a result, it was found that x=0.035, a=0.549, b=0.209, c=0.241, and d=0.000.

[Zirconium Coating Step]

The calcinated product 8 obtained as described above and zirconium oxide powder were dry-mixed such that the atomic ratio of zirconium atoms to the total of nickel atoms, cobalt atoms, and manganese atoms became 0.300 mol %, thereby obtaining a zirconium-coated lithium metal composite oxide powder 8.

[Aluminum Coating Step]

The calcinated product 8 and aluminum oxide were weighed such that Al/(Ni+Co+Mn)=0.01, and were mixed in an atmosphere containing water and carbon dioxide gas using a Loedige mixer. The resulting was calcined in ambient atmosphere at 850° C. for 10 hours, thereby obtaining a positive electrode active material 8 for a lithium secondary battery.

Comparative Example 1

Production of Positive Electrode Active Material 9 for Lithium Secondary Battery

[Step of Producing Nickel-Cobalt-Manganese Composite Hydroxide]

Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.510:0.225:0.265, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 11.5 as measured at 40° C. Then, a nitrogen gas-air mixture as an oxidizing gas was allowed to flow through the reaction vessel, and respective liquid amounts were adjusted such that the reaction time became 11 hours, thereby obtaining a nickel-cobalt-manganese composite hydroxide particles. The obtained particles were washed with an aqueous solution of sodium hydroxide, dehydrated and separated by a centrifugal separator, and dried at 105° C. to obtain a nickel-cobalt-manganese composite hydroxide 9.

[Mixing Step]

The thus obtained nickel-cobalt-manganese composite hydroxide 9 and a lithium carbonate powder were weighed such that Li/(Ni+Co+Mn)=1.07, followed by mixing.

[Calcination Step]

The mixture obtained in the mixing step described above was calcinated in an oxygen atmosphere at 870° C. for 10 hours, thereby obtaining a calcinated product 9.

The composition analysis of the obtained calcinated product 9 was performed and the results were applied to the composition formula (A). As a result, it was found that x=0.034, a=0.514, b=0.224, c=0.262, and d=0.000.

[Coating Step]

The calcinated product 9 and aluminum oxide were weighed such that Al/(Ni+Co+Mn)=0.01, and were dry-mixed using a FM mixer. The resulting was calcinated in ambient atmosphere at 760° C. for 3 hours, thereby obtaining a positive electrode active material 9 for a lithium secondary battery.

Figure 4:
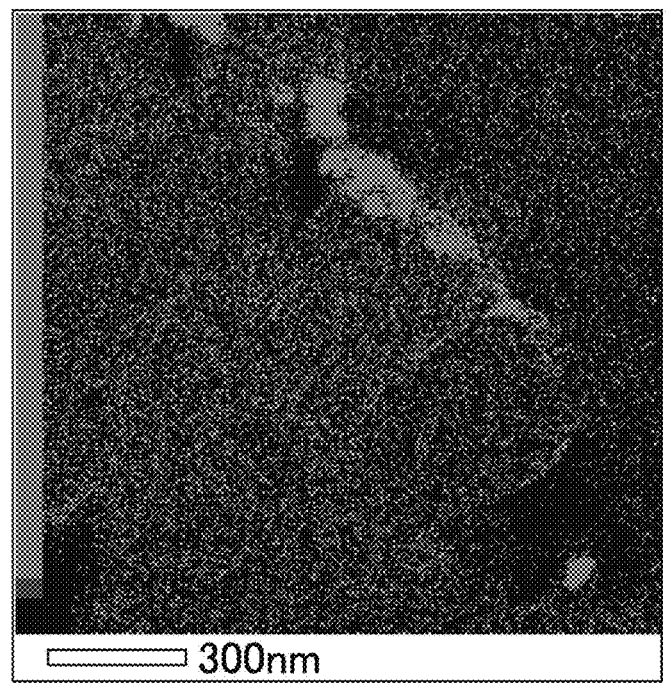
FIG. 4 is an image diagram obtained by aluminum element mapping by STEM-EDX with respect to a cross section of a positive electrode active material for a lithium secondary battery of Comparative Example 1.

Evaluation of Positive Electrode Active Material 9 for Lithium Secondary Battery The particle cross sections of the obtained positive electrode active material 9 for a lithium secondary battery were subjected to aluminum element mapping by STEM-EDX, and it was confirmed that the coating layer containing an aluminum element was formed ununiformly in the form of lumps on the particle surfaces. The results are shown in FIG. 4.

Comparative Example 2

Production of Positive Electrode Active Material 10 for Lithium Secondary Battery [Mixing Step]

The nickel-cobalt-manganese composite hydroxide 9 and a lithium carbonate powder were weighed such that Li/(Ni+Co+Mn)=1.07, followed by mixing.
[Calcination Step]

The mixture obtained in the mixing step described above was calcinated in an oxygen atmosphere at 870° C. for 5 hours, thereby obtaining a calcinated product 10.

The composition analysis of the obtained calcinated product 10 was performed and the results were applied to the composition formula (A). As a result, it was found that x=0.029, a=0.512, b=0.224, c=0.264, and d=0.000.
[Coating Step]

The calcinated product 10 and aluminum oxide were weighed such that Al/(Ni+Co+Mn)=0.01, and were dry-mixed using a FM mixer. The resulting was calcinated in ambient atmosphere at 760° C. for 3 hours, thereby obtaining a positive electrode active material 10 for a lithium secondary battery.

Comparative Example 3

Production of Positive Electrode Active Material 11 for Lithium Secondary Battery
[Step of Producing Nickel-Cobalt-Manganese Composite Hydroxide]

Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.510:0.225:0.265, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 11.8 as measured at 40° C. Then, a nitrogen gas-air mixture as an oxidizing gas was allowed to flow through the reaction vessel, and respective liquid amounts were adjusted such that the reaction time became 20 hours, thereby obtaining a nickel-cobalt-manganese composite hydroxide particles. The obtained particles were washed with an aqueous solution of sodium hydroxide, dehydrated and separated by a centrifugal separator, and dried at 105° C. to obtain a nickel-cobalt-manganese composite hydroxide 11.
[Mixing Step]

The thus obtained nickel-cobalt-manganese composite hydroxide 11 and a lithium carbonate powder were weighed such that Li/(Ni+Co+Mn)=1.07, followed by mixing.
[Calcination Step]

The mixture obtained in the mixing step described above was calcinated in an oxygen atmosphere at 720° C. for 3 hours, thereby obtaining a calcinated product 11.

The composition analysis of the obtained calcinated product 11 was performed and the results were applied to the composition formula (A). As a result, it was found that x=0.024, a=0.519, b=0.222, c=0.259, and d=0.000.
[Coating Step]

The calcinated product 11 and aluminum oxide were weighed such that Al/(Ni+Co+Mn)=0.01, and were mixed in an atmosphere containing water and carbon dioxide gas using a Loedige mixer. The resulting was calcined in ambient atmosphere at 850° C. for 5 hours, thereby obtaining a positive electrode active material 11 for a lithium secondary battery.

Comparative Example 4

Production of Positive Electrode Active Material 12 for Lithium Secondary Battery
[Step of Producing Nickel-Cobalt Composite Hydroxide]

Into a reaction vessel equipped with a stirrer and an overflow pipe was charged water, followed by addition of an aqueous sodium hydroxide solution. The temperature of the resulting liquid was maintained at 50 to 55° C.

An aqueous nickel sulfate solution and an aqueous cobalt sulfate solution were mixed together such that the atomic ratio of nickel atoms to cobalt atoms became 0.890:0.110, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel fell within the range of 11.8 to 12.5 as measured at 40° C. Then, a nitrogen gas-air mixture as an oxidizing gas was allowed to flow through the reaction vessel, and respective liquid amounts were adjusted such that the reaction time became 19 hours, thereby obtaining a nickel-cobalt composite hydroxide particles. The obtained particles were washed with an aqueous solution of sodium hydroxide, dehydrated and separated by a centrifugal separator, and dried at 105° C. to obtain a nickel-cobalt composite hydroxide 12.
[Mixing Step]

The thus obtained nickel-cobalt composite hydroxide 12 and a lithium hydroxide powder were weighed such that Li/(Ni+Co)=1.07, followed by mixing.
[Calcination Step]

The mixture obtained in the mixing step described above was calcinated in an oxygen atmosphere at 720° C. for 6 hours, thereby obtaining a calcinated product 12.
[Rinsing Step]

Thereafter, the obtained calcinated product 12 was rinsed with water. The rinsing step was performed by stirring a slurry-like liquid obtained by adding the calcinated product 12 to pure water for 20 minutes, followed by dehydration.
[Drying Step]

Thereafter, the resulting wet cake obtained in the dehydration step was vacuum-dried at 80° C. for 15 hours and at 150° C. for 8 hours to obtain a rinsed dry powder 12 of lithium metal composite oxide.

The composition analysis of the obtained rinsed dry powder 12 of lithium metal composite oxide was performed and the results were applied to the composition formula (A). As a result, it was found that x=−0.005, a=0.892, b=0.108, c=0.000, and d=0.000.
[Coating Step]

The rinsed dry powder 12 of lithium metal composite oxide and aluminum oxide were weighed such that Al/(Ni+

Co)=0.015, and were dry-mixed using a Loedige mixer. The resulting was calcined in an oxygen atmosphere at 720° C. for 5 hours, thereby obtaining a positive electrode active material 12 for a lithium secondary battery.

Comparative Example 5

Production of Positive Electrode Active Material 13 for Lithium Secondary Battery
[Step of Producing Nickel-Cobalt-Manganese-Aluminum Composite Hydroxide]

Into a reaction vessel equipped with a stirrer and an overflow pipe was charged water, followed by addition of an aqueous sodium hydroxide solution. The temperature of the resulting liquid was maintained at 60° C.

An aqueous nickel sulfate solution, an aqueous cobalt sulfate solution, an aqueous manganese sulfate solution and an aqueous aluminum sulfate solution were mixed together such that the atomic ratio between nickel atoms, cobalt atoms, manganese atoms and aluminum atoms became 0.855:0.095:0.020:0.030, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 10.2 as measured at 40° C. Then, a nitrogen gas-air mixture as an oxidizing gas was allowed to flow through the reaction vessel, and respective liquid amounts were adjusted such that the reaction time became 11 hours, thereby obtaining a nickel-cobalt-manganese-aluminum composite hydroxide particles. The obtained particles were washed with an aqueous solution of sodium hydroxide, dehydrated and separated by a centrifugal separator, and dried at 105° C. to obtain a nickel-cobalt-manganese-aluminum composite hydroxide 13.

[Mixing Step]

The thus obtained nickel-cobalt-manganese-aluminum composite hydroxide 13 and a lithium hydroxide powder were weighed such that Li/(Ni+Co+Mn+Al)=1.00, followed by mixing. The resulting was further dry-mixed with a tungsten oxide powder such that the atomic ratio of tungsten atoms to the total of nickel atoms, cobalt atoms, manganese atoms and aluminum atoms became 0.5 mol %.

[Calcination Step]

The mixture obtained in the mixing step described above was calcined in an oxygen atmosphere at 770° C. for 5 hours, thereby obtaining a calcinated product 13.

The composition analysis of the obtained calcinated product 13 was performed and the results were applied to the composition formula (A). As a result, it was found that x=0.000, a=0.864, b=0.093, c=0.018, and d=0.024.

Tungsten was present on the particle surface and, hence, was excluded from d.

[Coating Step]

The calcinated product 13 and aluminum oxide were weighed such that Al[1]/(Ni+Co+Mn+Al[2])=0.02, and were mixed in an atmosphere containing water and carbon dioxide gas using a Loedige mixer. The resulting was heat-treated in an oxygen atmosphere at 770° C. for 5 hours, thereby obtaining a positive electrode active material 13 for a lithium secondary battery.

Here, Al[1] represents aluminum derived from the aluminum oxide as the coating material, and Al[2] represents aluminum derived from the calcinated product 13.

Comparative Example 6

Production of Positive Electrode Active Material 14 for Lithium Secondary Battery
[Mixing Step]

The nickel-cobalt-manganese-aluminum composite hydroxide 13 and a lithium hydroxide powder were weighed such that Li/(Ni+Co+Mn+Al)=1.02, followed by mixing. The resulting was further dry-mixed with a tungsten oxide powder such that the atomic ratio of tungsten atoms to the total of nickel atoms, cobalt atoms, manganese atoms and aluminum atoms became 0.125 mol %.

[Calcination Step]

The mixture obtained in the mixing step described above was calcined in an oxygen atmosphere at 770° C. for 5 hours, thereby obtaining a calcinated product 14.

The composition analysis of the obtained calcinated product 14 was performed and the results were applied to the composition formula (A). As a result, it was found that x=0.005, a=0.864, b=0.093, c=0.018, and d=0.025.

Tungsten was present on the particle surface and, hence, was excluded from d.

[Coating Step]

The calcinated product 14 and aluminum oxide were weighed such that Al[1]/(Ni+Co+Mn+Al[2])=0.02, and were mixed in an atmosphere containing water and carbon dioxide gas using a Loedige mixer. The resulting was heat-treated in an oxygen atmosphere at 770° C. for 5 hours, thereby obtaining a positive electrode active material 14 for a lithium secondary battery.

Here, Al[1] represents aluminum derived from the aluminum oxide as the coating material, and Al[2] represents aluminum derived from the calcinated product 14.

Comparative Example 7

Production of Positive Electrode Active Material 15 for Lithium Secondary Battery The zirconium-coated powder 8 of lithium metal composite oxide was calcinated in ambient atmosphere at 850° C. for 10 hours, thereby obtaining a positive electrode active material 15 for a lithium secondary battery.

With respect to each of Examples 1 to 8 and Comparative Examples 1 to 7, Tables 1 and 2 collectively show the coating method; the water content; the BET specific surface area; the lithium carbonate content; the lithium hydroxide content; parameters when an aluminum coating layer was formed, i.e., the average value of $AR_3$, and $[Ave(AR_3/AR_{10})/\sigma(AR_3/AR_{10})]$ which is a reciprocal of coefficient of variation of the ratio between $AR_3$ and $AR_{10}$ ($AR_3/AR_{10}$); parameters when a tungsten coating layer was formed, i.e., the average value of $WR_3$, and $[Ave(WR_3/WR_{10})/\sigma(WR_3/WR_{10})]$ which is a reciprocal of coefficient of variation of the ratio between $WR_3$ and $WR_{10}$ ($WR_3/WR_{10}$); parameters when a zirconium coating layer was formed, i.e., the average value of $ZR_5$, and $[Ave(ZR_5/ZR_{10})/\sigma(ZR_5/ZR_{10})]$ which is a reciprocal of coefficient of variation of the ratio between $ZR_5$ and $ZR_{10}$ ($ZR_5/ZR_{10}$); and the battery swelling.

TABLE 1

| | Coating step | | | | | | Water content (ppm) | BET m²/g | Li$_2$CO$_3$ content (% by mass) | LiOH content (% by mass) |
|---|---|---|---|---|---|---|---|---|---|---|
| | Coating method | Feed amount of coating element | Mixing conditions | Heating conditions | Heat treatment atmosphere | Rinsing/drying | | | | |
| Ex. 1 | Al source: wet coating | Al 1 mol % | Lodge mixer, humidification with Air/CO$_2$ | 760° C., 5 hr | Air | None | 200 | 0.89 | 0.08 | 0.13 |
| Ex. 2 | Al source: wet coating | Al 1 mol % | Lodge mixer, humidification with Air/CO$_2$ | 760° C., 5 hr | Air | None | 240 | 1.30 | 0.09 | 0.16 |
| Ex. 3 | Al source: dry coating | Al 1 mol % | VG mixer, dry | 760° C., 5 hr | Air | None | 550 | 1.10 | 0.13 | 0.18 |
| Ex. 4 | Al source: wet coating | Al 1 mol % | Lodge mixer, humidification with Air/CO$_2$ | 760° C., 5 hr | Air | None | 260 | 0.51 | 0.10 | 0.12 |
| Ex. 5 | Al source: dry coating | Al 1.5 mol % | Lodge mixer, dry | 720° C., 5 hr | O$_2$ | After Al coating | 540 | 1.50 | 0.16 | 0.12 |
| Ex. 6 | Al source: dry coating | Al 1.5 mol % | Lodge mixer, dry | 720° C., 5 hr | O$_2$ | After Al coating | 250 | 1.20 | 0.11 | 0.10 |
| Ex. 7 | W source: wet addition Al source: wet coating | W 0.5 mol %, Al 1 mol % | W: Lodge mixer, spray-heat mixing Al: Lodge mixer, humidification with Air/CO$_2$ | 760° C., 5 hr | Air | None | 180 | 0.73 | 0.26 | 0.27 |
| Ex. 8 | Zr source: dry mixing Al source: wet coating | Zr 0.3 mol %, Al 1 mol % | Zr: dry mixing Al: Lodge mixer, humidification with Air/CO$_2$ | 850° C., 10 hr | Air | None | 430 | 1.10 | 0.15 | 0.21 |
| Comp. Ex. 1 | Al source: dry coating | Al 1 mol % | FM mixer, dry | 760° C., 3 hr | Air | None | 240 | 0.90 | 0.10 | 0.16 |
| Comp. Ex. 2 | Al source: dry coating | Al 1 mol % | FM mixer, dry | 760° C., 3 hr | Air | None | 340 | 1.20 | 0.10 | 0.21 |
| Comp. Ex. 3 | Al source: wet coating | Al 1 mol % | Lodge mixer, humidification with Air/CO$_2$ | 850° C., 5 hr | Air | None | 663 | 1.10 | 0.20 | 0.18 |
| Comp. Ex. 4 | Al source: dry coating | Al 1.5 mol % | Lodge mixer, dry | 720° C., 5 hr | O$_2$ | Before Al coating | 160 | 0.28 | 0.12 | 0.25 |
| Comp. Ex. 5 | W source: dry mixing Al source: wet coating | W 0.5 mol %, Al 2 mol % | W: Prior addition (simultaneously with Li source mixing) Al: Lodge mixer, humidification with Air/CO$_2$ | 770° C., 5 hr | O$_2$ | None | 395 | 0.77 | 0.30 | 0.64 |
| Comp. Ex. 6 | W source: dry mixing Al source: wet coating | W 0.125 mol % Al 2 mol % | W: Prior addition (simultaneously with Li source mixing) Al: Lodge mixer, humidification with Air/CO$_2$ | 770° C., 5 hr | O$_2$ | None | 256 | 0.36 | 0.32 | 0.53 |
| Comp. Ex. 7 | Zr source: dry coating | Zr 0.3 mol % | Dry mixing | 850° C., 10 hr | Air | None | 680 | 1.10 | 0.31 | 0.21 |

TABLE 2

| | Al coating layer | | W coating layer | | Zr coating layer | | Battery swelling cm³/g |
|---|---|---|---|---|---|---|---|
| | Ave. of AR$_3$ | [Ave.(AR$_3$/AR$_{10}$)]/[σ(AR$_3$/AR$_{10}$)] | Ave. of WR$_3$ | [Ave.(WR$_3$/WR$_{10}$)]/[σ(WR$_3$/WR$_{10}$)] | Ave. of ZR$_5$ | [Ave.(ZR$_5$/ZR$_{10}$)]/[σ(ZR$_5$/ZR$_{10}$)] | |
| Ex. 1 | 0.114 | 7.41 | — | — | — | — | 0.04 |
| Ex. 2 | 0.079 | 6.51 | — | — | — | — | 0.11 |
| Ex. 3 | 0.065 | 7.05 | — | — | — | — | 0.12 |
| Ex. 4 | 0.121 | 6.65 | — | — | — | — | 0.03 |
| Ex. 5 | 0.047 | 6.81 | — | — | — | — | 0.13 |
| Ex. 6 | 0.04 | 6.92 | — | — | — | — | 0.11 |
| Ex. 7 | 0.022 | 5.57 | 0.016 | 4.75 | — | — | 0.20 |
| Ex. 8 | 0.021 | 4.81 | — | — | 0.012 | 3.24 | 0.12 |
| Comp. Ex. 1 | 0.088 | 6.04 | — | — | — | — | 0.26 |
| Comp. Ex. 2 | 0.075 | 5.40 | — | — | — | — | 0.45 |
| Comp. Ex. 3 | 0.10 | 2.72 | — | — | — | — | 0.37 |

TABLE 2-continued

| | Al coating layer | | W coating layer | | Zr coating layer | | Battery swelling cm³/g |
|---|---|---|---|---|---|---|---|
| | Ave. of $AR_3$ | $[Ave.(AR_3/AR_{10})]/[\sigma(AR_3/AR_{10})]$ | Ave. of $WR_3$ | $[Ave.(WR_3/WR_{10})]/[\sigma(WR_3/WR_{10})]$ | Ave. of $ZR_5$ | $[Ave.(ZR_5/ZR_{10})]/[\sigma(ZR_5/ZR_{10})]$ | |
| Comp. Ex. 4 | 0.058 | 4.16 | — | — | — | — | 0.60 |
| Comp. Ex. 5 | 0.026 | 4.59 | 0.006 | 2.65 | — | — | 0.45 |
| Comp. Ex. 6 | 0.036 | 11.93 | 0.002 | 1.38 | — | — | 1.00 |
| Comp. Ex. 7 | — | — | — | — | Not detectable | Not detectable | 0.37 |

As shown in Tables 1 and 2, in Examples 1 to 8 to which the present invention was applied, the level of battery swelling was 0.2 cm³/g or less, which is low as compared to those in Comparative Examples 1 to 7 to which the present invention was not applied.

DESCRIPTION OF THE REFERENCE SIGNS

1 Separator
2 Positive electrode
3 Negative electrode
4 Electrode group
5 Battery can
6 Electrolytic liquid
7 Top insulator
8 Sealing body
10 Lithium secondary battery
21 Positive electrode lead
31 Negative electrode lead

The invention claimed is:

1. A positive electrode active material for a lithium secondary battery, which is in the form of particles, and comprises a lithium-containing composite metal compound in the form of secondary particles that are aggregates of primary particles capable of being doped and undoped with lithium ions, each of the secondary particles having on its surface a coating layer comprising a metal composite oxide comprising lithium and aluminum, and having a lithium ion conductivity, wherein the positive electrode active material comprises at least nickel and aluminum as non-lithium metals,
wherein a lithium carbonate content is 0.3% by mass or less and a lithium hydroxide content is 0.3% by mass or less, and
wherein the positive electrode active material satisfies all of requirements (1) to (2) below:
(1) $[Ave(AR_3/AR_{10})]/[\sigma(AR_3/AR_{10})]$, which is a reciprocal of coefficient of variation $[\sigma(AR_3/AR_{10})]/[Ave(AR_3/AR_{10})]$, is 6.1 or more, wherein:
AR is a ratio of a detection intensity of aluminum and a detection intensity of nickel (detection intensity of aluminum/detection intensity of nickel), each measured by scanning electron microscopy-energy dispersive X-ray spectroscopy (SEM-EDX) with respect to surfaces of the particles of the positive electrode active material for a lithium secondary battery,
$AR_3$ is AR when the SEM-EDX is performed at an acceleration voltage of 3 kV,
$AR_{10}$ is AR when the SEM-EDX is performed at an acceleration voltage of 10 kV,
$[Ave(AR_3/AR_{10})]$ is an average of values of a ratio of the $AR_3$ to the $AR_{10}$ $[AR_3/AR_{10}]$,
$[\sigma(AR_3/AR_{10})]$ is a standard deviation of values of a ratio of the $AR_3$ to the $AR_{10}$ $[AR_3/AR_{10}]$, and
$[\sigma(AR_3/AR_{10})]/[Ave(AR_3/AR_{10})]$ is a coefficient of variation calculated from the average and the standard deviation, and
(2) an average value of $AR_3$ is 0.025 or more.

2. A positive electrode active material for a lithium secondary battery, which is in the form of particles, and comprises a lithium-containing composite metal compound in the form of secondary particles that are aggregates of primary particles capable of being doped and undoped with lithium ions, each of the secondary particles having on its surface a coating layer comprising a metal composite oxide comprising lithium and zirconium, and having a lithium ion conductivity, wherein the positive electrode active material comprises at least nickel and zirconium as non-lithium metals,
wherein a lithium carbonate content is 0.3% by mass or less and a lithium hydroxide content is 0.3% by mass or less, and
wherein the positive electrode active material satisfies all of requirements (1) to (2) below:
(1) $[Ave(ZR_5/ZR_{10})]/[\sigma(ZR_5/ZR_{10})]$, which is a reciprocal of coefficient of variation $[\sigma(ZR_5/ZR_{10})]/[Ave(ZR_5/ZR_{10})]$, is 1.0 or more, wherein:
ZR is a ratio of a detection intensity of zirconium and a detection intensity of nickel (detection intensity of zirconium/detection intensity of nickel), each measured by scanning electron microscopy-energy dispersive X-ray spectroscopy (SEM-EDX) with respect to surfaces of the particles of the positive electrode active material for a lithium secondary battery,
$ZR_5$ is ZR when the SEM-EDX is performed at an acceleration voltage of 5 kV,
$ZR_{10}$ is ZR when the SEM-EDX is performed at an acceleration voltage of 10 kV,
$[Ave(ZR_5/ZR_{10})]$ is an average of values of a ratio of the $ZR_5$ to the $ZR_{10}$ $[ZR_5/ZR_{10}]$,
$[\sigma(ZR_5/ZR_{10})]$ is a standard deviation of values of a ratio of the $ZR_5$ to the $ZR_{10}$ $[ZR_5/ZR_{10}]$, and
$[\sigma(ZR_5/ZR_{10})]/[Ave(ZR_5/ZR_{10})]$ is a coefficient of variation calculated from the average and the standard deviation, and
(2) an average value of $ZR_5$ is 0.002 or more.

3. A positive electrode active material for a lithium secondary battery, which is in the form of particles, and comprises a lithium-containing composite metal compound in the form of secondary particles that are aggregates of primary particles capable of being doped and undoped with lithium ions, each of the secondary particles having on its surface a coating layer comprising a metal composite oxide comprising lithium and tungsten, and having a lithium ion conductivity, wherein the positive electrode active material comprises at least nickel and tungsten as non-lithium metals, wherein a lithium carbonate content is 0.3% by mass or less and a lithium hydroxide content is 0.3% by mass or less, and wherein the positive electrode active material satisfies all of requirements (1) to (2) below:

(1) [Ave($WR_3/WR_{10}$)]/[σ($WR_3/WR_{10}$)], which is a reciprocal of coefficient of variation [σ($WR_3/WR_{10}$)]/[Ave($WR_3/WR_{10}$)], is 2.5 or more, wherein:

WR is a ratio of a detection intensity of tungsten and a detection intensity of nickel (detection intensity of tungsten/detection intensity of nickel), each measured by scanning electron microscopy-energy dispersive X-ray spectroscopy (SEM-EDX) with respect to surfaces of the particles of the positive electrode active material for a lithium secondary battery, $WR_3$ is WR when the SEM-EDX is performed at an acceleration voltage of 3 kV, $WR_{10}$ is WR when the SEM-EDX is performed at an acceleration voltage of 10 kV,

[Ave($WR_3/WR_{10}$)] is an average of values of a ratio of the $WR_3$ to the $WR_{10}$ [$WR_3/WR_{10}$],

[σ($WR_3/WR_{10}$)] is a standard deviation of values of a ratio of the $WR_3$ to the $WR_{10}$ [$WR_3/WR_{10}$], and

[σ($WR_3/WR_{10}$)]/[Ave($WR_3/WR_{10}$)] is a coefficient of variation calculated from the average and the standard deviation, and (2) an average value of $WR_3$ is 0.005 or more.

4. The positive electrode active material according to claim 1, which has a BET specific surface area of 0.1 m²/g or more and 2.0 m²/g or less.

5. The positive electrode active material according to claim 1, which has a water content of 600 ppm or less.

6. The positive electrode active material according to claim 1, wherein the lithium-containing composite metal compound has an α-NaFeO₂ type crystal structure represented by formula (A) below:

$$Li[Li_x(Ni_aCo_bMn_cM^1_d)_{1-x}]O_2 \qquad (A)$$

wherein −0.1≤x≤0.2, 0.5≤a<1, 0≤b≤0.3, 0≤c≤0.3, 0≤d≤0.1, a+b+c+d=1, and M¹ is at least one metal selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.

7. The positive electrode active material according to claim 6, wherein x in the formula (A) satisfies the following relationship: 0<x≤0.1.

8. A positive electrode for a lithium secondary battery, comprising the positive electrode active material of claim 1.

9. A lithium secondary battery, comprising the positive electrode of claim 8.

* * * * *